(12) United States Patent
Nichol et al.

(10) Patent No.: US 11,004,238 B2
(45) Date of Patent: *May 11, 2021

(54) APPARATUS AND METHOD FOR FORMULATION AND DISPENSING OF VISUALLY CUSTOMIZED COSMETICS

(71) Applicant: Sephora USA, Inc., San Francisco, CA (US)

(72) Inventors: Jamie Gordon Nichol, Carlisle, MA (US); Sung K. Park, Brookline, MA (US)

(73) Assignee: Sephora USA, Inc., San Francisco, CA (US)

(*) Notice: Subject to any disclaimer, the term of this patent is extended or adjusted under 35 U.S.C. 154(b) by 281 days.

This patent is subject to a terminal disclaimer.

(21) Appl. No.: 16/185,904

(22) Filed: Nov. 9, 2018

(65) Prior Publication Data
US 2019/0080480 A1    Mar. 14, 2019

Related U.S. Application Data

(63) Continuation of application No. 15/782,403, filed on Oct. 12, 2017, now Pat. No. 10,366,513, which is a
(Continued)

(51) Int. Cl.
*G06T 7/90* (2017.01)
*A45D 44/00* (2006.01)
(Continued)

(52) U.S. Cl.
CPC ............ *G06T 7/90* (2017.01); *A45D 44/005* (2013.01); *B01F 5/0619* (2013.01);
(Continued)

(58) Field of Classification Search
CPC ........ G06T 7/90; H04N 7/185; H04N 5/2256; B65D 83/0022; A45D 44/005; A45D 2044/007; G09B 19/0023
(Continued)

(56) References Cited

U.S. PATENT DOCUMENTS 3,370,754 A    2/1968   Cook et al.
3,739,947 A    6/1973   Baumann et al.
(Continued)

FOREIGN PATENT DOCUMENTS

CA    2 400 748 A1    10/2001
CA    2 461 307 C     4/2003
(Continued)

OTHER PUBLICATIONS

Centore, P., "Perceptual Reflectance Weighting for Estimating Kubleka-Munk Coefficients," Abstract, 22 pages, Mar. 9, 2014.
(Continued)

*Primary Examiner* — Michael C Grant
(74) *Attorney, Agent, or Firm* — Van Pelt, Yi & James LLP

(57) ABSTRACT

A portioning machine for providing a custom cosmetic includes a mixer having a mixing chamber and also accommodates a plurality of dispensers having outlets that are directly coupled to the mixing chamber. In one embodiment, the portioning machine includes a plurality of slots, where each slot is configured to receive an assembly having at least one dispenser. In another embodiment, the portioning machine includes a slot configured to receive an assembly having a plurality of dispensers. Each dispenser is associated with an actuator, and the portioning machine includes a portioning processor configured to control the actuators to dispense additives from selected dispensers into the mixing
(Continued)

chamber in accordance with a target set of additive ratios to produce the custom cosmetic.

22 Claims, 24 Drawing Sheets

Related U.S. Application Data continuation of application No. 15/427,399, filed on Feb. 8, 2017, now Pat. No. 9,858,685.

(60) Provisional application No. 62/292,567, filed on Feb. 8, 2016.

(51) Int. Cl.
| | |
|---|---|
| B01F 15/02 | (2006.01) |
| G01J 3/46 | (2006.01) |
| B01F 5/06 | (2006.01) |
| B01F 13/10 | (2006.01) |
| B65D 83/00 | (2006.01) |
| G09B 19/00 | (2006.01) |
| H04N 5/225 | (2006.01) |
| H04N 7/18 | (2006.01) |

(52) U.S. Cl.
CPC ...... *B01F 13/1063* (2013.01); *B01F 15/0226* (2013.01); *B01F 15/0237* (2013.01); *B01F 15/0279* (2013.01); *B65D 83/0022* (2013.01); *G01J 3/463* (2013.01); *G09B 19/0023* (2013.01); *H04N 5/2256* (2013.01); *H04N 7/185* (2013.01); *A45D 2044/007* (2013.01); *A45D 2200/054* (2013.01); *A45D 2200/058* (2013.01)

(58) Field of Classification Search
USPC ........................................................ 434/100
See application file for complete search history.

(56) References Cited

U.S. PATENT DOCUMENTS

| | | | |
|---|---|---|---|
| 4,651,262 A | 3/1987 | Piironen | |
| 4,988,503 A | 1/1991 | Macchio et al. | |
| 5,094,276 A | 3/1992 | Caputo et al. | |
| 5,163,010 A | 11/1992 | Klein et al. | |
| 5,198,875 A | 3/1993 | Bazin et al. | |
| 5,316,712 A | 5/1994 | Ono et al. | |
| 5,520,203 A | 5/1996 | Segerstrom | |
| 5,598,843 A | 2/1997 | Caisey et al. | |
| 5,622,692 A | 4/1997 | Rigg et al. | |
| 5,636,637 A | 6/1997 | Guiolet et al. | |
| 5,800,816 A | 9/1998 | Brieva et al. | |
| 5,903,465 A | 5/1999 | Brown | |
| 5,945,112 A | 8/1999 | Flynn et al. | |
| 5,965,112 A | 10/1999 | Brieva et al. | |
| 5,992,705 A | 11/1999 | Lhuisset | |
| 6,177,093 B1 | 1/2001 | Lombardi et al. | |
| 6,284,228 B1 | 9/2001 | Markowitz et al. | |
| 6,338,349 B1 | 1/2002 | Robinson et al. | |
| 6,402,364 B1 | 6/2002 | Esclar et al. | |
| 6,412,658 B1 | 7/2002 | Bartholomew et al. | |
| D461,080 S | 8/2002 | Bartholomew et al. | |
| 6,437,866 B1 | 8/2002 | Flynn | |
| D465,810 S | 11/2002 | Bartholomew et al. | |
| 6,510,366 B1 | 1/2003 | Murray et al. | |
| 6,516,245 B1 | 2/2003 | Dirksing et al. | |
| 6,603,550 B1 | 8/2003 | Flynn et al. | |
| 6,615,881 B2 | 9/2003 | Bartholomew et al. | |
| 6,622,064 B2 | 9/2003 | Bartholomew et al. | |
| 6,655,551 B2 | 12/2003 | Manne | |
| D485,310 S | 1/2004 | Bartholomew et al. | |
| 6,672,341 B2 | 1/2004 | Bartholomew et al. | |
| 6,779,686 B2 | 8/2004 | Bartholomew et al. | |
| 6,807,297 B1 | 10/2004 | Tankovich et al. | |
| D500,804 S | 1/2005 | Bartholomew et al. | |
| 6,883,561 B2 | 4/2005 | Bartholomew et al. | |
| 6,935,386 B2 | 8/2005 | Miller et al. | |
| D513,040 S | 12/2005 | Bartholomew et al. | |
| 7,082,970 B2 | 8/2006 | Bartholomew et al. | |
| 7,090,740 B2 | 8/2006 | Dronzek | |
| 7,099,740 B2 | 8/2006 | Bartholomew et al. | |
| 7,119,930 B1 | 10/2006 | Carstensen et al. | |
| 7,121,429 B2 | 10/2006 | Bartholomew et al. | |
| 7,151,851 B2 | 12/2006 | Ladjevardi | |
| 7,174,310 B2 | 2/2007 | Bartholomew et al. | |
| 7,206,664 B2 | 4/2007 | Schmid | |
| 7,394,538 B2 | 7/2008 | Bazin | |
| 7,395,134 B2 | 7/2008 | Bartholomew et al. | |
| 7,445,372 B1 | 11/2008 | Engel et al. | |
| 7,475,710 B2 | 1/2009 | Bartholomew et al. | |
| 7,517,571 B2 | 4/2009 | Funke et al. | |
| 7,522,768 B2 | 4/2009 | Bhatti et al. | |
| 7,522,769 B2 | 4/2009 | Harville et al. | |
| 7,522,825 B2 | 4/2009 | Kenet | |
| 7,624,769 B2 | 12/2009 | Bartholomew et al. | |
| 7,721,978 B2 | 5/2010 | Chevalier | |
| 7,822,504 B2 | 10/2010 | Bartholomew et al. | |
| 7,972,266 B2 | 7/2011 | Gobeyn et al. | |
| 8,017,137 B2 | 9/2011 | Bartholomew et al. | |
| 8,026,942 B2 | 9/2011 | Payonk et al. | |
| 8,141,596 B2 | 3/2012 | Bartholomew et al. | |
| 8,186,872 B2 | 5/2012 | Bartholomew et al. | |
| 8,238,623 B2 | 8/2012 | Stephan et al. | |
| 8,351,038 B2 | 1/2013 | Carroll et al. | |
| 8,352,070 B2 | 1/2013 | Bartholomew et al. | |
| 8,358,348 B2 | 1/2013 | Mohammadi et al. | |
| 8,437,540 B2 | 5/2013 | Stephan et al. | |
| 8,527,365 B2 | 9/2013 | Pak | |
| 8,532,736 B1 | 9/2013 | Malzbender et al. | |
| 8,564,778 B1 | 10/2013 | Igarashi | |
| 8,573,263 B2 | 11/2013 | Bartholomew et al. | |
| 8,593,634 B1 | 11/2013 | Igarashi | |
| 8,596,498 B2 | 12/2013 | Werner et al. | |
| 8,608,371 B2 | 12/2013 | Bartholomew et al. | |
| 8,636,173 B2 | 1/2014 | Bartholomew et al. | |
| 8,640,432 B2 | 2/2014 | Rodrigues | |
| 8,666,540 B2 | 3/2014 | Milhorn | |
| 8,693,768 B1 | 4/2014 | LaForgia | |
| 8,695,610 B2 | 4/2014 | Samain et al. | |
| 8,702,772 B2 | 4/2014 | Luzon et al. | |
| 8,709,003 B2 | 4/2014 | Island et al. | |
| 8,830,467 B2 | 9/2014 | Igarashi | |
| 8,830,468 B2 | 9/2014 | Igarashi | |
| 8,880,218 B2 | 11/2014 | Bartholomew et al. | |
| 8,884,242 B2 | 11/2014 | Chhibber et al. | |
| 8,908,904 B2 | 12/2014 | Santos et al. | |
| 8,915,562 B2 | 12/2014 | Edgar et al. | |
| 8,933,994 B2 | 1/2015 | Gross et al. | |
| 8,995,760 B2 | 3/2015 | Gill | |
| 9,007,588 B1 | 4/2015 | Igarashi | |
| 9,064,180 B2 | 6/2015 | Korichi et al. | |
| 9,101,320 B2 | 8/2015 | Cummins et al. | |
| 9,122,918 B2 | 9/2015 | Howell et al. | |
| 9,122,919 B2 | 9/2015 | Howell et al. | |
| 9,239,294 B2 | 1/2016 | Wagner et al. | |
| 9,256,963 B2 | 2/2016 | Cummins et al. | |
| 9,384,543 B2 | 7/2016 | Stephan et al. | |
| 9,427,187 B2 | 8/2016 | Gilbert | |
| 9,442,494 B2 | 9/2016 | Igarashi | |
| 9,449,400 B2 | 9/2016 | Stephan et al. | |
| 9,452,279 B2 | 9/2016 | Stevens et al. | |
| 9,498,974 B2 | 11/2016 | Choi | |
| 9,522,112 B2 | 12/2016 | Dubois et al. | |
| 9,674,323 B1 | 6/2017 | Yu et al. | |
| 9,858,685 B2 | 1/2018 | Nichol et al. | |
| 10,314,378 B2 * | 6/2019 | Rabe .................... | A45D 34/00 |
| 2001/0047309 A1 | 11/2001 | Bartholomew et al. | |
| 2002/0082745 A1 | 6/2002 | Wilmott et al. | |
| 2002/0179639 A1 | 12/2002 | Bartholomew et al. | |
| 2003/0067545 A1 | 4/2003 | Giron et al. | |
| 2003/0090176 A1 | 5/2003 | Bartholomew et al. | |

(56) References Cited

U.S. PATENT DOCUMENTS

| | | |
|---|---|---|
| 2004/0078278 A1 | 4/2004 | Dauga et al. |
| 2004/0202684 A1 | 10/2004 | Djerassi |
| 2005/0111729 A1 | 5/2005 | Caisey |
| 2005/0195316 A1 | 9/2005 | Kollias et al. |
| 2006/0000852 A1 | 1/2006 | Manne |
| 2006/0001193 A1 | 1/2006 | Booth |
| 2006/0092315 A1 | 5/2006 | Payonk et al. |
| 2006/0124196 A1 | 6/2006 | Bartholomew et al. |
| 2006/0152744 A1 | 7/2006 | Sanger |
| 2006/0193800 A1 | 8/2006 | Reinhardt et al. |
| 2006/0280851 A1 | 12/2006 | Pike |
| 2007/0035815 A1 | 2/2007 | Edgar et al. |
| 2007/0058860 A1 | 3/2007 | Harville et al. |
| 2007/0097358 A1 | 5/2007 | Oon et al. |
| 2007/0189627 A1 | 8/2007 | Cohen et al. |
| 2007/0253987 A1 | 11/2007 | Wozniak et al. |
| 2008/0080766 A1 | 4/2008 | Payonk et al. |
| 2008/0194928 A1 | 8/2008 | Bandic et al. |
| 2008/0311061 A1 | 12/2008 | Heuer |
| 2009/0151741 A1 | 6/2009 | Ngo |
| 2009/0194571 A1 | 8/2009 | Evans |
| 2009/0210322 A1 | 8/2009 | Stark |
| 2009/0213379 A1 | 8/2009 | Carroll et al. |
| 2010/0181340 A1 | 7/2010 | Wallace et al. |
| 2010/0185064 A1 | 7/2010 | Bandic et al. |
| 2010/0225429 A1 | 9/2010 | Tsai |
| 2010/0284245 A1 | 11/2010 | McNicol et al. |
| 2011/0162673 A1 | 7/2011 | Samain et al. |
| 2011/0164263 A1 | 7/2011 | Samain et al. |
| 2011/0176029 A1 | 7/2011 | Boydston et al. |
| 2011/0226803 A1 | 9/2011 | Schwartz |
| 2011/0247718 A1 | 10/2011 | Samain |
| 2011/0288680 A1 | 11/2011 | Samain et al. |
| 2011/0304877 A1 | 12/2011 | Bitoh |
| 2012/0152406 A1 | 6/2012 | Bartholomew et al. |
| 2012/0203089 A1 | 8/2012 | Rule et al. |
| 2012/0236425 A1 | 9/2012 | O'Neill |
| 2012/0300050 A1 | 11/2012 | Korichi et al. |
| 2012/0307032 A1 | 12/2012 | Gomi et al. |
| 2012/0320340 A1 | 12/2012 | Coleman, III |
| 2013/0012144 A1 | 1/2013 | Besoli et al. |
| 2013/0083185 A1 | 4/2013 | Coleman, III |
| 2013/0084259 A1 | 4/2013 | Lee |
| 2013/0098382 A1 | 4/2013 | Martin et al. |
| 2013/0107109 A1 | 5/2013 | Yang |
| 2013/0123973 A1 | 5/2013 | Saranow et al. |
| 2013/0300919 A1 | 11/2013 | Fletcher et al. |
| 2014/0050635 A1 | 2/2014 | Azzi et al. |
| 2014/0071547 A1 | 3/2014 | O'Neill et al. |
| 2014/0074193 A1 | 3/2014 | Luzon et al. |
| 2014/0078594 A1 | 3/2014 | Springer |
| 2014/0081462 A1 | 3/2014 | Igarashi |
| 2014/0081463 A1 | 3/2014 | Igarashi |
| 2014/0082854 A1 | 3/2014 | Landa et al. |
| 2014/0094964 A1 | 4/2014 | Bartholomew et al. |
| 2014/0152990 A1 | 6/2014 | Ehbets et al. |
| 2014/0176787 A1 | 6/2014 | Sheng et al. |
| 2014/0267882 A1 | 9/2014 | O'Neill et al. |
| 2014/0268376 A1 | 9/2014 | O'Neill et al. |
| 2014/0296112 A1 | 10/2014 | O'Driscoll et al. |
| 2014/0304629 A1 | 10/2014 | Cummins et al. |
| 2014/0311625 A1 | 10/2014 | Bartholomew et al. |
| 2014/0323873 A1 | 10/2014 | Cummins et al. |
| 2014/0368629 A1 | 12/2014 | Lucet-Levannier et al. |
| 2014/0368731 A1 | 12/2014 | Hyers |
| 2015/0002950 A1 | 1/2015 | O'Neill et al. |
| 2015/0009500 A1 | 1/2015 | Wong et al. |
| 2015/0021356 A1 | 1/2015 | Witchell et al. |
| 2015/0025343 A1 | 1/2015 | Gareau et al. |
| 2015/0030243 A1 | 1/2015 | Qu et al. |
| 2015/0042877 A1 | 2/2015 | O'Neill et al. |
| 2015/0065803 A1 | 3/2015 | Douglas et al. |
| 2015/0087359 A1 | 3/2015 | O'Neill et al. |
| 2015/0099463 A1 | 4/2015 | Stuntebeck et al. |
| 2015/0172522 A1 | 6/2015 | O'Neill et al. |
| 2015/0177147 A1 | 6/2015 | Mangan et al. |
| 2015/0198522 A1 | 7/2015 | Wei et al. |
| 2015/0287191 A1 | 10/2015 | Koruga et al. |
| 2015/0293430 A1 | 10/2015 | O'Neill et al. |
| 2015/0297129 A1 | 10/2015 | Gilbert |
| 2015/0314141 A1 | 11/2015 | Choi |
| 2015/0334258 A1 | 11/2015 | O'Neill |
| 2015/0356661 A1 | 12/2015 | Rousay |
| 2015/0370150 A1 | 12/2015 | O'Neill et al. |
| 2016/0015152 A1 | 1/2016 | Ajiki et al. |
| 2016/0022011 A1 | 1/2016 | Rabe et al. |
| 2016/0022972 A1 | 1/2016 | Rabe et al. |
| 2016/0080548 A1 | 3/2016 | Erickson et al. |
| 2016/0082403 A1 | 3/2016 | Ounzar |
| 2016/0106369 A1 | 4/2016 | Yetik |
| 2016/0107133 A1 | 4/2016 | Sugino et al. |
| 2016/0184566 A1 | 6/2016 | Ibrahim et al. |
| 2016/0270509 A1 | 9/2016 | Shahrur et al. |
| 2016/0270511 A1 | 9/2016 | Wee |
| 2016/0309877 A1 | 10/2016 | Papshev et al. |
| 2016/0346799 A1* | 12/2016 | Muller ................ B05B 11/0054 |
| 2016/0361526 A1 | 12/2016 | Rabe et al. |
| 2017/0196471 A1 | 7/2017 | Inoue et al. |
| 2017/0228892 A1 | 8/2017 | Nichol et al. |

FOREIGN PATENT DOCUMENTS

| | | |
|---|---|---|
| CA | 2 574 486 C | 2/2006 |
| CA | 2 587 098 A1 | 5/2006 |
| CN | 1348760 A | 5/2002 |
| CN | 101432748 A | 5/2009 |
| CN | 201853459 U | 6/2011 |
| CN | 104789590 A | 7/2015 |
| EP | 2 000 089 A1 | 12/2008 |
| FR | 2 650 890 A1 | 2/1991 |
| FR | 2 937 853 | 10/2008 |
| HK | 1069746 A1 | 10/2007 |
| HK | 1117623 A1 | 8/2013 |
| JP | 4231407 B2 | 12/2008 |
| JP | 4699473 B2 | 6/2011 |
| JP | 5196695 B2 | 5/2013 |
| JP | 5514289 B2 | 4/2014 |
| JP | 2014-168781 A | 9/2014 |
| JP | 2015-178959 | 10/2015 |
| JP | 2016-026183 | 2/2016 |
| JP | 2016-026183 A | 2/2016 |
| KR | 2001-0092556 | 10/2001 |
| KR | 10-2006-0109797 | 10/2006 |
| KR | 10-2007-0006288 | 1/2007 |
| KR | 10-2007-0100158 | 10/2007 |
| KR | 10-2010-0062903 | 6/2010 |
| KR | 10-2011-0019793 | 3/2011 |
| KR | 10-2011-0095987 | 8/2011 |
| KR | 10-2012-0075517 | 7/2012 |
| KR | 10-2012-0135594 | 12/2012 |
| KR | 10-2013-0062845 | 6/2013 |
| KR | 10-2013-0111753 | 10/2013 |
| KR | 10-2014-0012386 | 2/2014 |
| KR | 10-2014-0072685 | 6/2014 |
| KR | 10-1490987 | 2/2015 |
| KR | 101520386 B1 | 5/2015 |
| KR | 10-1555636 B1 | 9/2015 |
| KR | 10-2015-0120542 | 10/2015 |
| KR | 10-2015-0134455 | 12/2015 |
| KR | 10-2016-0075131 | 6/2016 |
| TW | 201401204 | 1/2014 |
| TW | 201401204 A | 1/2014 |
| WO | WO 01/55956 A1 | 8/2001 |
| WO | WO 2001/75586 A1 | 10/2001 |
| WO | WO 03/026458 A2 | 4/2003 |
| WO | WO 2004/091477 A2 | 10/2004 |
| WO | WO 2006/024962 A2 | 3/2006 |
| WO | WO 2006/052863 A1 | 5/2006 |
| WO | WO 2006/081351 A2 | 8/2006 |
| WO | WO 2008/108763 A1 | 9/2008 |
| WO | WO 2010/049907 A2 | 5/2010 |
| WO | WO 2012/058641 A2 | 5/2012 |
| WO | WO 2012/082738 A1 | 6/2012 |
| WO | WO 2014/043018 A1 | 3/2014 |

(56) References Cited

FOREIGN PATENT DOCUMENTS

| WO | WO 2015/003319 A1 | 1/2015 |
| WO | WO 2015/088079 A1 | 6/2015 |
| WO | WO 2015/111002 A1 | 7/2015 |

OTHER PUBLICATIONS

Kubleka, P, et al. "An Article on Optics of Paint Layers," *Z. Tech. Phys*, vol. 12, pp. 593-601 (1931).
International Searching Authority, International Search Report—International Application No. PCT/US2014/016920, dated May 18, 2017, together with the Written Opinion of the International Searching Authority, 22 pages.

* cited by examiner

APPARATUS AND METHOD FOR FORMULATION AND DISPENSING OF VISUALLY CUSTOMIZED COSMETICS

CROSS-REFERENCE TO RELATED APPLICATION(S)

This patent application is a continuation of, and therefore claims priority from, U.S. patent application Ser. No. 15/782,403 filed on Oct. 12, 2017, now U.S. Pat. No. 10,366,513, which is a continuation of, and therefore claims priority from, U.S. patent application Ser. No. 15/427,399 filed on Feb. 8, 2017, now U.S. Pat. No. 9,858,685, which claims the benefit of U.S. provisional patent application Ser. No. 62/292,567 filed on Feb. 8, 2016, each which is hereby incorporated herein by reference in its entirety.

TECHNICAL FIELD

The present invention relates to cosmetics, and more particularly to creating customized cosmetics.

SUMMARY OF THE EMBODIMENTS

In accordance with certain embodiments of the invention, a system, apparatus and method for determining color of skin of a subject is disclosed. The method comprises covering a region of skin with a chamber having an open area facing the skin. The skin is illuminated with light caused to enter the chamber. The light is dispersed within the chamber, and a camera, which is positioned to have a light path from the chamber, is used to record an image of a portion of the dispersed light in the chamber. The recorded image is then processed to characterize the skin color. In certain exemplary embodiments of the invention, the chamber is predominantly white, although the chamber can be other colors in various alternative embodiments. In other embodiments of the invention, the chamber includes an integrating sphere. In yet other embodiments, the chamber includes a plano-convex lens, a bi convex lens, or a positive meniscus lens. The chamber may be part of a housing that is positioned over the camera, for example, by being physically coupled to a device (e.g., a mobile device) that includes the camera. The device may include a flash, and the housing may include a light passage positioned over the flash.

In certain embodiments of the invention, the processing is performed on a mobile device associated with the camera, e.g., a mobile device having an integrated camera. In certain embodiments of the invention, the camera has associated automatic camera settings, and the method comprises disabling the automatic camera settings, setting the flash associated with the camera to a low intensity, and waiting a predetermined amount of time after firing of the flash, in order for the light output thereof to stabilize, before capturing the image.

Certain embodiments of the invention include processing where RGB color values are received from the camera and the received RGB color values are mapped to a CIE L a*b* color space, CIE L a*b* coordinates for each of a plurality of stored color recipes are retrieved from a memory, and a closest match between the mapped RGB color values and a stored color recipe is identified so that the closest match characterizes the skin color. In certain embodiments, user input is received to alter the RGB color values in accordance with user preference.

Embodiments may include a tangible, non-transitory computer readable medium having embodied therein a computer program which, when loaded into and executed by a device having a camera and a flash, cause the device to perform computer processes for determining color of skin of a subject, the computer processes comprising activating the flash to illuminate the skin to cause light therefrom to enter a light dispersion chamber through an open area facing the skin, using the camera to record an image of a portion of the dispersed light in the chamber, and processing the recorded image to characterize the skin color. In certain embodiments of the invention, the camera has associated automatic camera settings, and the method comprises disabling the automatic camera settings, setting the flash associated with the camera to a low intensity, and waiting a predetermined amount of time after firing of the flash, in order for the light output thereof to stabilize, before capturing the image. Certain embodiments of the invention include processing where RGB color values are received from the camera and the received RGB color values are mapped to a CIE L a*b* color space, CIE L a*b* coordinates for each of a plurality of stored color recipes are retrieved from a memory, and a closest match between the mapped RGB color values and a stored color recipe is identified so that the closest match characterizes the skin color. In certain embodiments, user input is received to alter the RGB color values in accordance with user preference.

Embodiments also may include apparatus for determining color of skin of a subject, wherein the apparatus comprises a light dispersing chamber having an open area configured to face the skin, a camera positioned to have a light path from the chamber, a flash, and a processor having associated memory and configured to perform any of the methods described above. In certain exemplary embodiments of the invention, the chamber is predominantly white, although the chamber can be other colors in various alternative embodiments. In other embodiments of the invention, the chamber includes an integrating sphere. In yet other embodiments, the chamber includes a plano-convex lens, a bi convex lens, or a positive meniscus lens. The chamber may be part of a housing that is positioned over the camera, for example, by being physically coupled to a device (e.g., a mobile device) that includes the camera, flash, and processor. The housing may include a light passage positioned over the flash. In certain embodiments of the invention, the processing is performed on a mobile device associated with the camera, e.g., a mobile device including the camera, flash, and processor. In certain embodiments of the invention, the camera has associated automatic camera settings, and the method comprises disabling the automatic camera settings, setting the flash associated with the camera to a low intensity, and waiting a predetermined amount of time after firing of the flash, in order for the light output thereof to stabilize, before capturing the image. Certain embodiments of the invention include processing where RGB color values are received from the camera and the received RGB color values are mapped to a CIE L a*b* color space, CIE L a*b* coordinates for each of a plurality of stored color recipes are retrieved from a memory, and a closest match between the mapped RGB color values and a stored color recipe is identified so that the closest match characterizes the skin color. In certain embodiments, user input is received to alter the RGB color values in accordance with user preference.

Embodiments also may include apparatus for use in determining color of skin of a subject, where the apparatus comprises a housing having a light dispersion chamber including an open area configured to face the skin and an opening providing a light path for a camera, and wherein the apparatus further comprises a light dispersion element disposed in the chamber in the light path. In certain exemplary embodiments of the invention, the chamber is predominantly white, although the chamber can be other colors in various alternative embodiments. In other embodiments of the invention, the chamber includes an integrating sphere. In yet other embodiments, the chamber includes a plano-convex lens, a bi convex lens, or a positive meniscus lens. The housing may include a light passage configured to direct light from a flash into the chamber.

In accordance with other embodiments of the invention, a system, apparatus and method for providing a cosmetic having a desired color match to skin of a subject is disclosed. The method comprises receiving a recipe of additives matched to the skin color of the subject. The method further comprises calculating, based upon the recipe of additives, syringe displacements for a portioning machine that includes at least one cartridge collectively having a plurality of cosmetic additives including a plurality of color pigments for cosmetics, which each cartridge including at least one syringe associated with a distinct one of the additives, and each syringe associated with a corresponding actuator. The method further comprises causing actuation of the plurality of actuators by the portioning machine to displace the plurality of syringes in accordance with the calculated displacements to extrude from the at least one cartridge a cosmetic that is a mixture of at least two of the plurality cosmetic additives, wherein the extruded cosmetic has the desired color match for the skin color of the subject. In certain embodiments, the recipe of additives specifies a volume and a set of additive ratios for the extruded cosmetic. In other embodiments, at least one cartridge is replaceable. At least one cartridge may include a plurality of syringes, each associated with a different cosmetic additive. Each actuator may be configured to produce rotational motion and/or translational motion.

Each syringe may include a piston that interfaces with a corresponding actuator in the portioning machine. Alternatively, each syringe may include an actuator that interfaces with the portioning machine via an electronic interface. The additives may include five color additives including yellow, red, black, blue, and white additives.

In certain embodiments of the invention, each syringe is coupled through a distinct line including a one-way valve to a corresponding distinct reservoir containing a cosmetic additive associated with the syringe. Each syringe may be configured to have both a dispensing stroke and a fill stroke, and the method may further comprise causing actuation of a given actuator associated with a given syringe to perform a fill stroke to fill the given syringe from a corresponding reservoir. In certain embodiments, receiving the recipe of colors involves receiving RGB color values from a camera, mapping the received RGB color values to a CIE L a*b* color space, retrieving from memory CIE L a*b* coordinates for each of a plurality of stored color recipes, and identifying a closest match between the mapped RGB color values and a stored color recipe, wherein the closest match characterizes the skin color.

Embodiments also may include a portioning machine for providing a cosmetic having a desired color matched to skin of a subject, wherein the portioning machine comprises at least one cartridge slot, each cartridge slot configured to receive a cartridge having at least one syringe associated with a distinct cosmetic additive for a cosmetic, each syringe associated with a corresponding actuator. The portioning machine also comprises a processor in communication with the at least one cartridge slot, the processor configured to receive a recipe of additives matched to the skin color of the subject, calculate syringe displacements based upon the recipe of additives, and cause actuation of the plurality of actuators to displace the plurality of syringes in accordance with the calculated displacements to extrude from the at least one cartridge a cosmetic that is a mixture of at least two of the plurality of cosmetic additives, wherein the extruded cosmetic has the desired color match for the skin color of the subject.

In various alternative embodiments, the recipe of additives may specify a volume and a set of additive ratios for the extruded cosmetic. At least one cartridge may be replaceable. At least one cartridge may include a plurality of syringes, each associated with a different cosmetic additive. Each actuator may be configured to produce at least one of rotational motion or translational motion. Each syringe may include a piston that interfaces with a corresponding actuator in the portioning machine. Alternatively, each syringe may include an actuator that interfaces with the portioning machine via an electronic interface. The additives may include yellow, red, black, blue, and white additives. Each syringe may be configured to have both a dispensing stroke and a fill stroke, and wherein the processor may be further configured to cause actuation of a given actuator associated with a given syringe to perform a fill stroke to fill the given syringe from a corresponding reservoir. Receiving the recipe of additives may involve receiving RGB color values from a camera, mapping the received RGB color values to a CIE L a*b* color space, retrieving from memory CIE L a*b* coordinates for each of a plurality of stored color recipes, and identifying a closest match between the mapped RGB color values and a stored color recipe, wherein the closest match characterizes the skin color.

Embodiments also may include a system for providing a cosmetic having a desired color matched to skin of a subject comprises a skin color matching device and a portioning machine in communication with the skin color matching device. The skin color matching device comprises a light dispersing chamber having an open area configured to face the skin, a camera positioned to have a light path from the chamber, a flash, and a skin color matching processor having associated memory configured to activate the flash to illuminate the skin to cause light therefrom to enter the light dispersion chamber through the open area facing the skin, use the camera to record an image of a portion of the dispersed light in the chamber, wherein the camera is positioned to have a light path from the light dispersion chamber, process the recorded image to characterize the skin color, and provide skin color characterization information to the portioning machine. The portioning machine comprises at least one cartridge slot, each cartridge slot configured to receive a cartridge having at least one syringe associated with a distinct cosmetic additive for a cosmetic, each syringe associated with a corresponding actuator, and a portioning processor in communication with the at least one cartridge slot, the portioning processor configured to receive a recipe of additives matched to the skin color of the subject based on the skin color characterization information, calculate syringe displacements based upon the recipe of additives, and cause actuation of the plurality of actuators to displace the plurality of syringes in accordance with the calculated displacements to extrude from the at least one cartridge a cosmetic that is a mixture of at least two of the plurality of cosmetic additives, wherein the extruded cosmetic has the desired color match for the skin color of the subject.

Embodiments also may include a cartridge for use in a portioning machine for providing a cosmetic having a desired color matched to skin of a subject, wherein the cartridge comprises at least one syringe, each syringe associated with a distinct cosmetic additive for a cosmetic. In various alternative embodiments, each syringe may include a one-way inlet valve configured to direct the distinct cosmetic additive from a distinct reservoir containing the distinct cosmetic additive into the syringe and also may include a one-way outlet valve configured to output a portion of the distinct cosmetic additive contained in the syringe for the cosmetic. The cartridge may be a replaceable cartridge. The cartridge may include a plurality of syringes, each associated with a different cosmetic additive. Each syringe may include a piston configured to interface with a corresponding actuator in the portioning machine. Alternatively, each syringe may include an actuator configured to interface with the portioning machine via an electronic interface. The cartridge may further include at least one reservoir, each reservoir associated with a distinct syringe and containing the distinct cosmetic additive associated with the syringe. Each syringe may be configured to have both a dispensing stroke and a fill stroke, wherein the fill stroke fills the syringe from a corresponding reservoir.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer. References to "embodiments of the invention" with respect to a particular function or feature do not necessary require that all embodiments include that particular function or feature.

Figure 1:
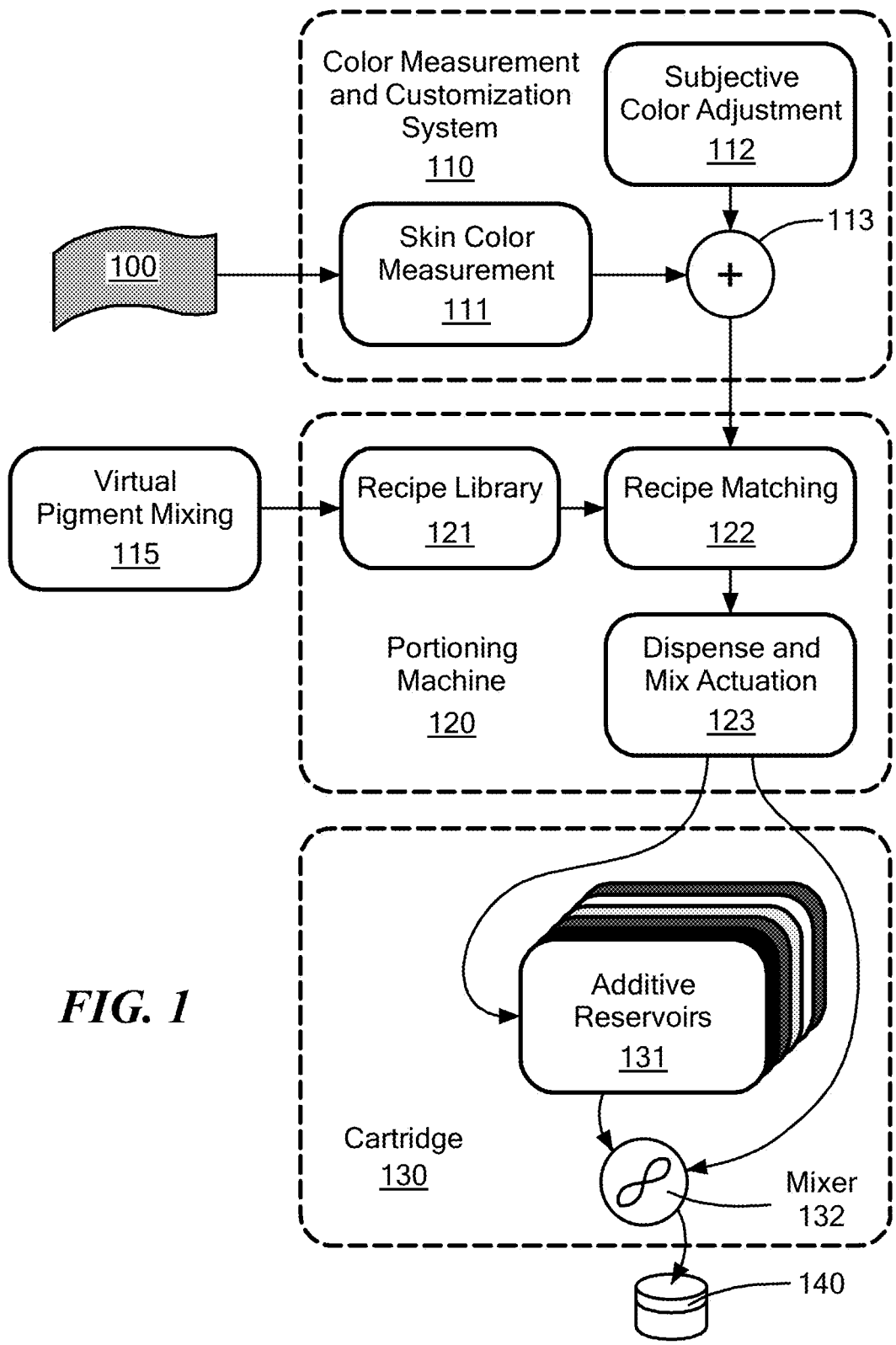
FIG. 1 shows a block diagram of a system for formulating and dispensing visually customized cosmetics in accordance with an embodiment of the present invention.

FIG. 1 shows a block diagram of a system for formulating and dispensing visually customized cosmetics. The block diagram is broken down into three functional units. The color measurement and customization system 110, the portioning machine 120, and the cartridge 130. The divisions between these functional units are somewhat arbitrary, and each implementation may group features into different functional units. The color measurement and customization system 110 includes skin color measurement module 111, after-sample color adjustment module 112, and summer 113, which combines the results of the two modules 111 and 112. In the embodiment presented here, the color measurement and customization system 110 functions are implemented on a smart phone or other camera-equipped portable computing device. The skin color measurement module 111 performs a skin color measurement of skin near or on the face 100 using spectrophotometric or comparable means. The subjective color adjustment module 112 is configured to operate based on at least one of user input, the color measurement itself, and ethnographic purchase modeling. The subjective color adjustment module 112, provides a numeric color difference to be added by summer 113 to the color measurement before the color measurement is shared with the portioning machine 120. The portioning machine 120 has three principal components, a recipe matching routine 122, a recipe library 121, and dispense and mix actuation module 123. A fourth component, the virtual pigment mixing module 115, performs a set of computations, which are run once for a given set of additives, based on work by Paul Centore, "Perceptual Reflectance Weighting for Estimating Kubleka-Munk Coefficients," (2014)(available at http://munsellcolourscienceforpainters.com/ColourSciencePapers/PerceptualReflectanceWei ghtingForKubelkaMunk.pdf), and work by Paul Kubleka and Frnkz Munk, "An Article on Optics of Paint Layers," Z. Tech. Phys 12.593-601 (1931)(available at http://www.graphics.cornell.edu/~westin/pubs/kubelka.pdf), among others; these articles are incorporated herein by reference in their entirety. The result of this virtual pigment mixing is a matrix of additive ratios and an accurate prediction of the resulting color. This matrix is written to the mixing machine once at the time of manufacture, and (to account for pigment changes or calibration adjustments) occasionally afterward via update as needed. The recipe library 121 may also be made available via nonvolatile memory attached to the cartridge 130. The portioning machine 120, in this embodiment, is a single physical machine roughly the size of a single-serve coffee maker. The recipe matching routine 122 takes the adjusted color from the color measurement and customization system 110 and converts the color to the corresponding CIE L a* b* color. The recipe matching routine 122 then runs a nearest neighbor search to identify the nearest color match. The match with the minimum Euclidian distance is taken to be the nearest color match. The selected recipe, in the form of a volume and a set of pigment ratios is delivered to the dispense and mix actuation module 123. The dispense and mix actuation module 123 acts on the cartridge 130 to cause appropriate volumes of each additive 131 to be dispensed, mixed in the cartridge 130, and dispensed into consumer packaging 140.

Figure 2A:
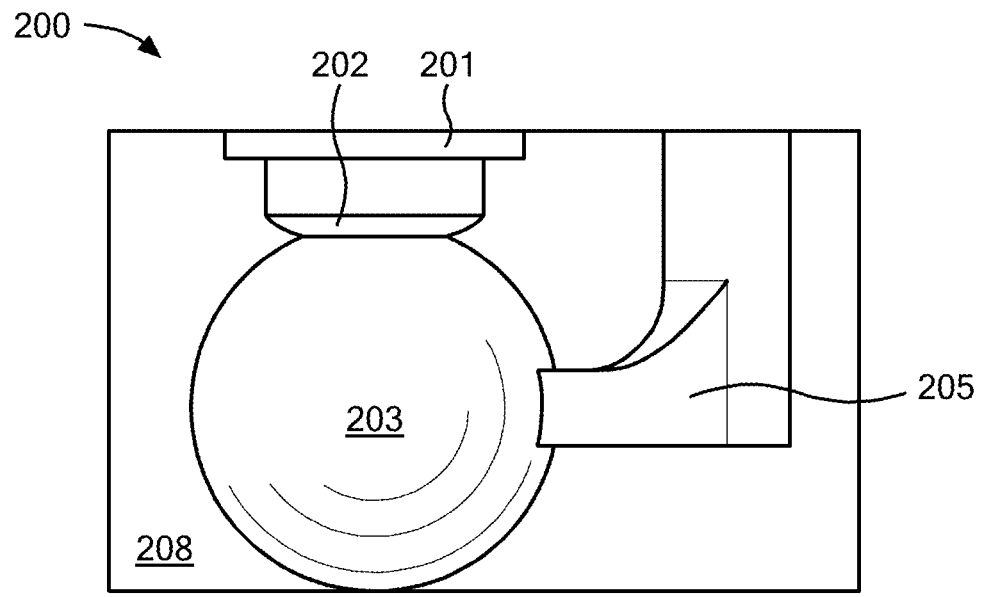
FIGS. 2A and 2B show a cross-sectional view and a perspective view of a housing including various internal structures in accordance with an embodiment of the present invention.
Figure 2B:
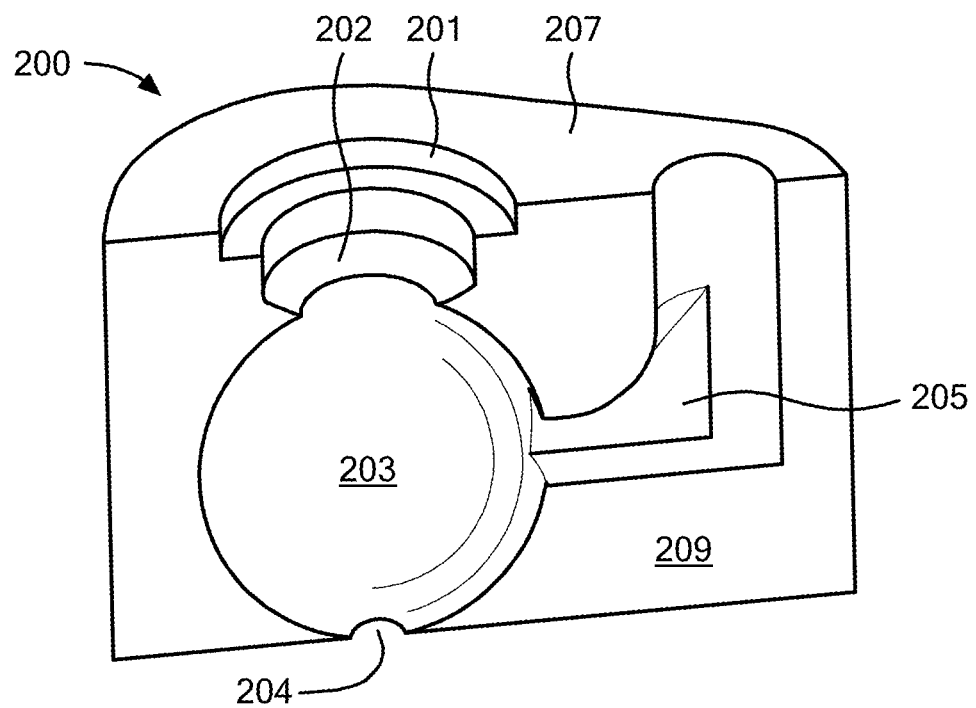

FIGS. 2A and 2B show a housing 200 that covers the lens and flash LED of a portable camera such as a camera that is part of a smart phone or other camera-equipped portable computing device (sometimes generally referred to herein as a "smart device") that implements the color measurement and customization system. FIG. 2A shows a cross-section of the color measurement and customization system including the various internal structures. FIG. 2B shows an alternative cross-section of the color measurement and customization system perspective.

The housing 200 directs the light from the flash LED built into the camera through the reflective light pipe 205. The light reflects off the inner surface of the light pipe until it is either absorbed or enters the integration sphere 203. This integration sphere 203 is coated with a diffuse, highly reflective coating, which causes the light to reflect off the inner surface one or more times before illuminating the skin sample visible in the port 204, thereby providing non-directional illumination to the skin sample. When the measurement face 209 of the color measurement and customization system housing 200 is held against the skin, the housing 208, being opaque, prevents ambient light from entering the integration sphere 203. Some of the light which strikes the skin sample through the port 204 passes through a plano-convex lens held in a suitably shaped counter bore 202 and passes into the camera lens of the smart device 201. The plano-convex lens is oriented such that the convex surface faces the port 204. Thus the convex surface distributes any light reflected from the convex surface into the sphere, instead of concentrating the reflected light back toward the port 204. The plano-convex lens also serves to shorten the focal distance—acting as a macro lens. The housing 208 attaches to the smartphone or smart device 301, e.g., via pressure sensitive adhesive applied to the mounting surface 207. When properly attached, the camera lens is centered in the counterbore 201 and the flash LED is centered in the entry to the reflective light passage 205. While this exemplary embodiment is described with reference to a plano-convex lens, it should be noted that alternative embodiments may use another type of lens, such as, for example, a bi convex lens or a positive meniscus lens.

Figure 3:
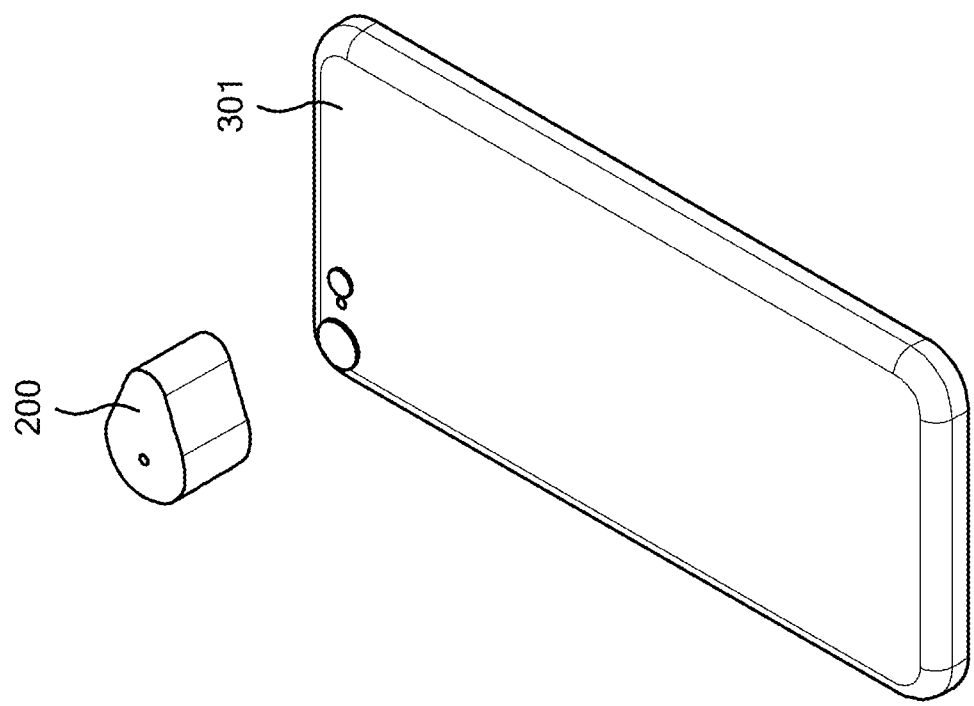
FIG. 3 shows the housing of FIGS. 2A and 2B in relation to the lens and flash of a smart device.

FIG. 3 shows the housing 200 of FIGS. 2A and 2B in relation to the lens and flash of a smart device 301.

Figure 4:
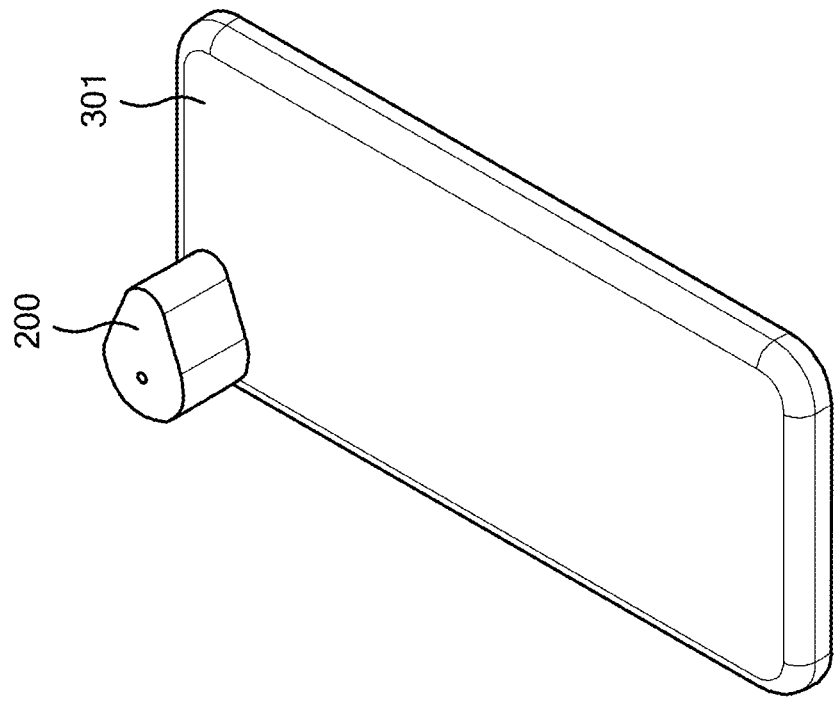
FIG. 4 shows the housing of FIGS. 2A and 2B mounted to a smart device.

FIG. 4 shows the housing 200 of FIGS. 2A and 2B mounted to a smart device. The housing 200 may be attached to the smart device using pressure sensitive adhesive, glue, or other attachment mechanism.

Figure 5:
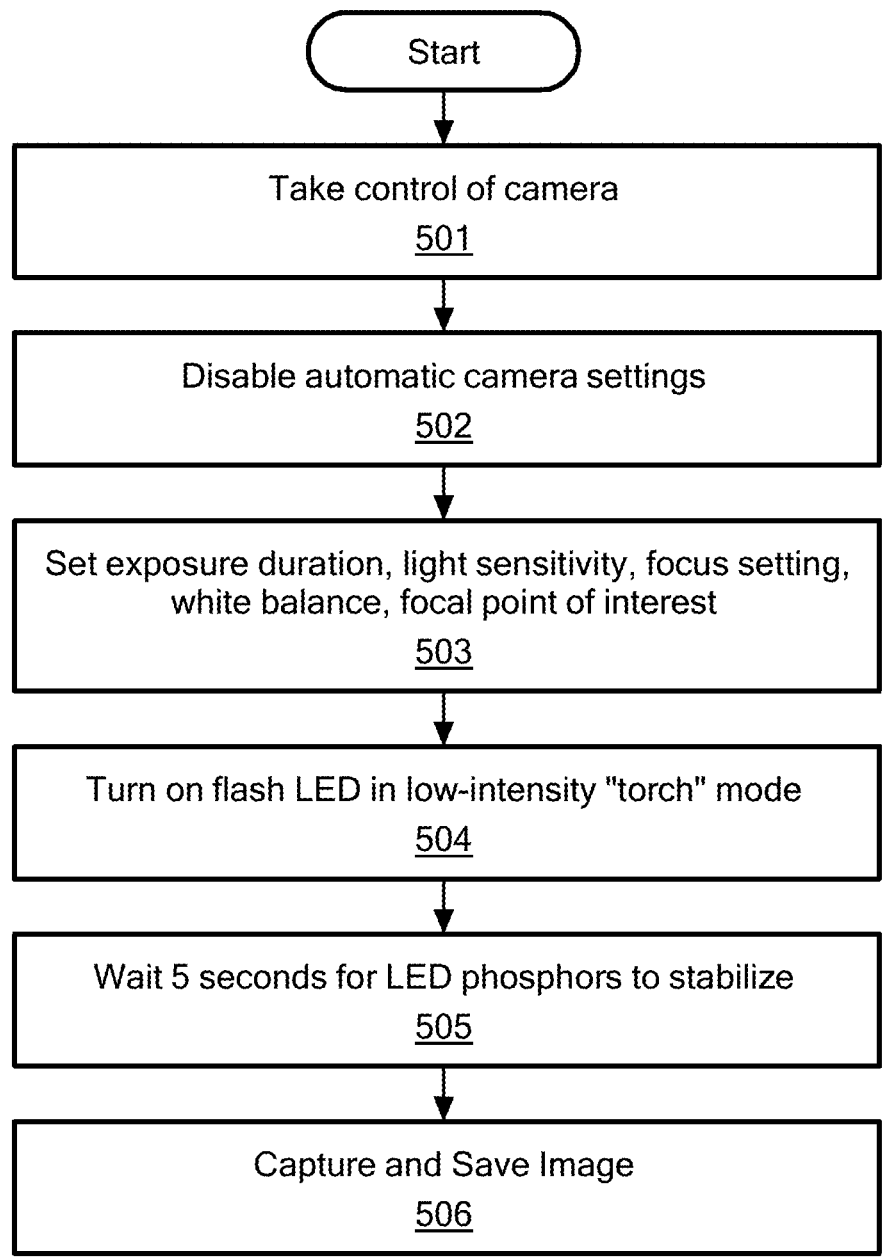
FIG. 5 is a flow chart of an embodiment for capturing an image using a color measurement and customization system in accordance with an embodiment of the present invention.

FIG. 5 is a flow chart of an embodiment for capturing an image using the color measurement and customization system in accordance with an embodiment of the present invention. The smart device providing the camera also includes a processor, and the processor has associated memory for storing an application that can be executed on the processor. The application requests exclusive control of the camera in process 501, via the provided API call. If control is not granted, execution is aborted. Once control is granted, the application disables all automatic camera settings (focus, shutter speed, exposure, etc.) again using documented API calls in process 502. Once automatic control is disabled, the application, via API calls, sets the exposure duration, and other settings chosen to allow for clear, well-lit images with the attached color measurement and customization system housing in process 503. It is vitally important, on at least some operating systems, for the application to set the focal point of interest—the point of the image the camera uses to evaluate focus and other image properties. The application illuminates the flash LED in low intensity mode in process 504 and waits for the light output for the phosphors in the LED to stabilize (e.g., around 5 seconds in certain exemplary embodiments) in process 505. The application captures an image, again via API call, and saves the image to the device photo library in process 506.

Figure 6:
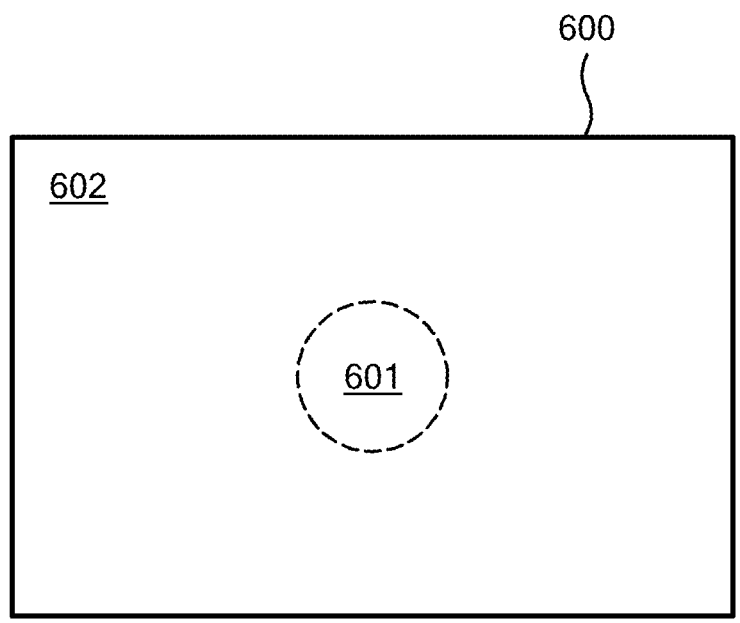
FIG. 6 is a diagrammatic representation of images captured using a color measurement and customization system in accordance with an embodiment of the present invention

FIG. 6 is a diagrammatic representation of an image captured using a camera 301 with the housing 200. The captured image 600 includes pixels that measure the light reaching the camera imaging device from the inside of the integration sphere 203. These pixels, corresponding to those in region 602, form the majority of the image. The pixels in region 602 can be used to set the white balance of the image, are useful as a calibration reference, and are an excellent target for focal point of interest functions built into the device operating system. The region near the center of image 601 is made up of pixels with values that change based on light reflected by the skin presented to port 204. The pixel values in region 601 are processed to obtain the color measurement.

Figure 7:
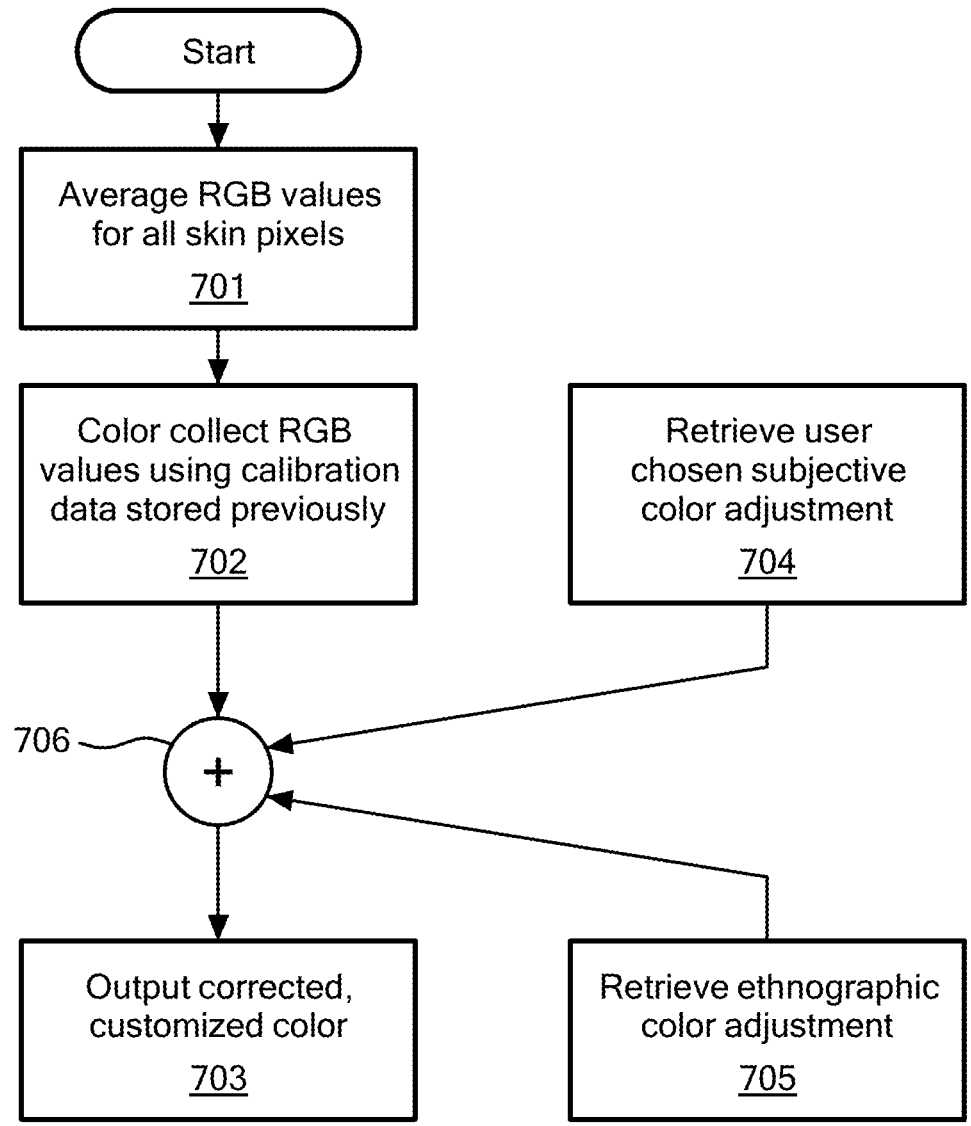
FIG. 7 is a flow chart of an embodiment of the invention for color measurement from an image of the skin of a user, and customization based on user preference and ethnographic data.

FIG. 7 is a flow chart of an embodiment of the invention for color measurement from an image of the skin of a user, and customization based on user preference and ethnographic data. Once the image is captured, as above, the color is extracted by averaging in process 701 all pixel values (e.g., RGB values) in region 601. Averaging compensates in some measure for variations in skin tone and imaging noise over the area being measured. This averaging preferably is accomplished using floating-point arithmetic, to allow for the increase in measurement precision afforded by the average. The color data is then passed to a set of three second-order polynomials in process 702 which return a calibrated color. The coefficients of these polynomials have been chosen using regression analysis and a calibration data set. The user can input a color adjustment via the user interface (described below). This user-input color correction is retrieved in process 704 together with a second ethnographic color adjustment in process 705. This ethnographic color adjustment in process 705 can be used to accommodate regional and ethnic purchase preference, to increase the likelihood of a first-time color match. The subjective color adjustment in process 704 and ethnographic color adjustment in process 705 are added in process 706 to the calibrated color value. The resulting corrected, customized color can be output in process 703 in any of several ways. The corrected values can be displayed on screen, stored in memory, and/or transmitted to the portioning machine 120.

Figure 8:
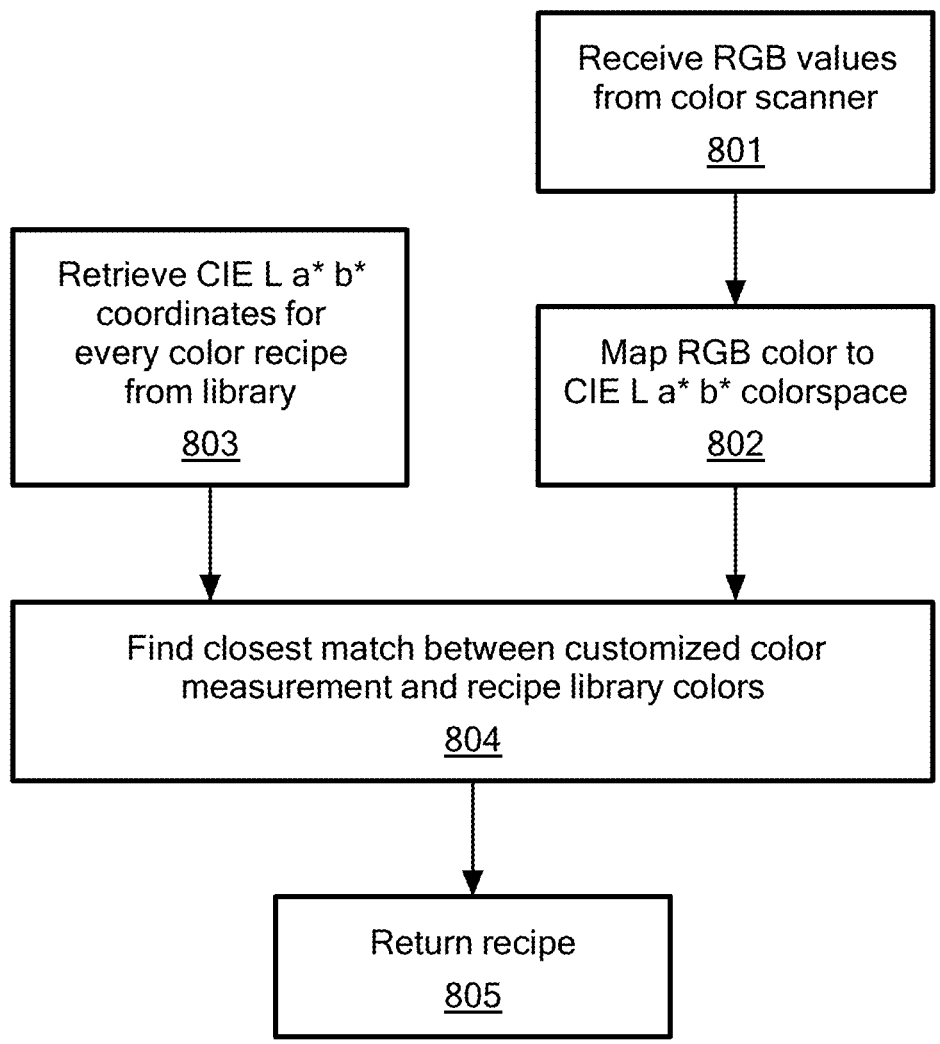
FIG. 8 is a flow chart of an embodiment of the invention for mapping received skin color from the color measurement and customization device to a corrected skin measurement and determining a color recipe.

FIG. 8 is a flow chart, in accordance with an embodiment of the invention, for mapping received skin color from the color measurement and customization device to a corrected skin measurement and determining a color recipe. In order to select a recipe to match a customer's skin tone preference, RGB values (corrected using calibration data and customized to match user preference and purchase trends) are received from the color measurement and customization device in process 801. In this embodiment, these RGB values conform to the sRGB standard, and, in process 802, are mapped to the CIE L a* b* color space for further use. In process 803, CIE L a* b* color recipe coordinates are retrieved from the library. Finally, a nearest neighbor search is performed in process 804 using the colors for each of the CIE L a* b* coordinates in the color recipe retrieved in process 803 from the library. In process 805, the recipe associated with the nearest color is returned as the recipe to formulate.

Figure 9:
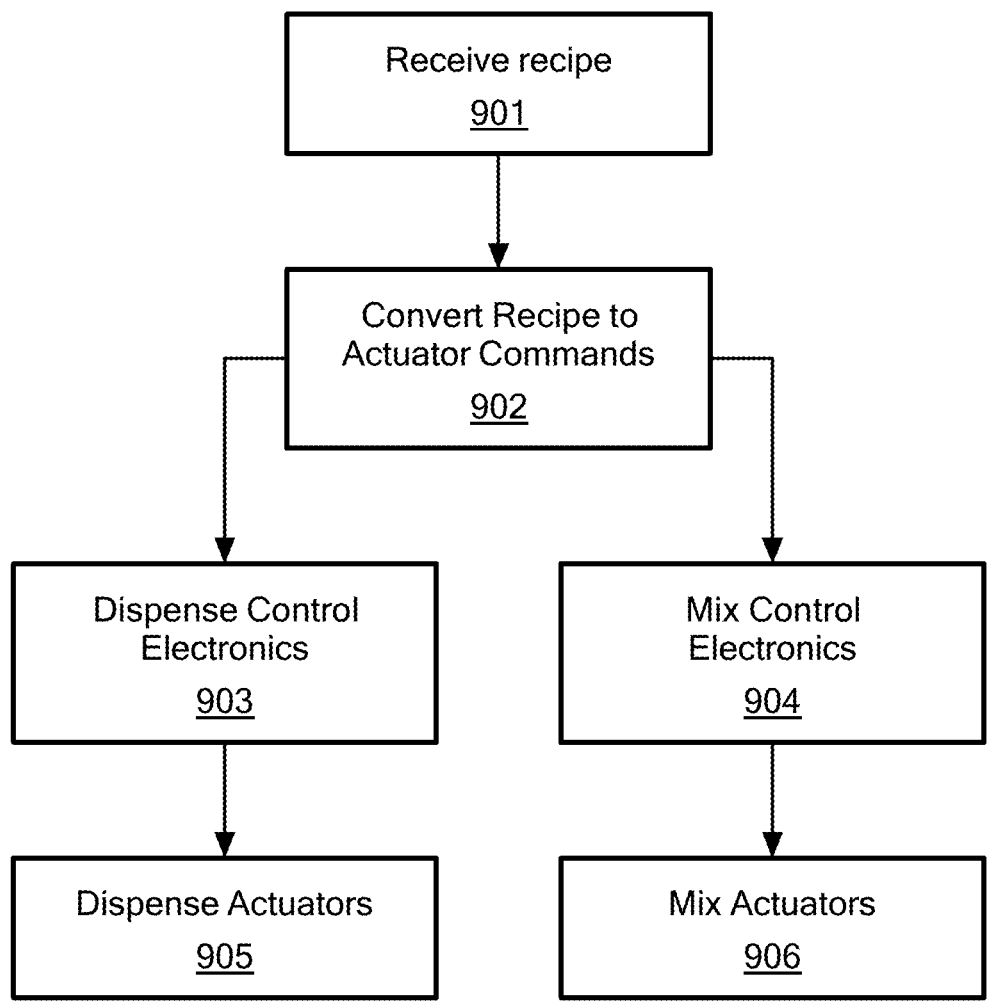
FIG. 9 is a flow chart, in accordance with an embodiment of the invention, showing conversion of a color recipe to actuator forces and/or displacements.

FIG. 9 is a flow chart, in accordance with an embodiment of the invention, showing conversion of a color recipe to actuator forces and/or displacements. The desired color recipe, consisting of ratios of additives which sum to unity, as well as an intended total final volume, is received in process 901 by the dispense and mix actuation control firmware. This firmware, using constants that relate actuator displacements and dispensed volume, calculates in process 902 the required motions of each of the actuators. The constants may be stored, for example, in the portioning machine 120, or in non-volatile memory physically attached to the cartridge 130. The calculated displacements are then relayed to the dispense control electronics in process 903. These dispense control electronics then cause actuator motions in process 905 that result in dispensing of product. Depending on the skin color or desired color recipe, some additives may not be included in the final product. Therefore, some actuator displacements may calculate to zero such that the corresponding actuator(s) receive zero displacement by the dispense control electronics. In embodiments where actuators are used for mixing, the firmware, via mix control electronics in process 904, also calculates displacements for the mix actuators. The mix control electronics in process 906 cause actuator motions that result in the mixing and dispensing of the finished product.

Figure 10:
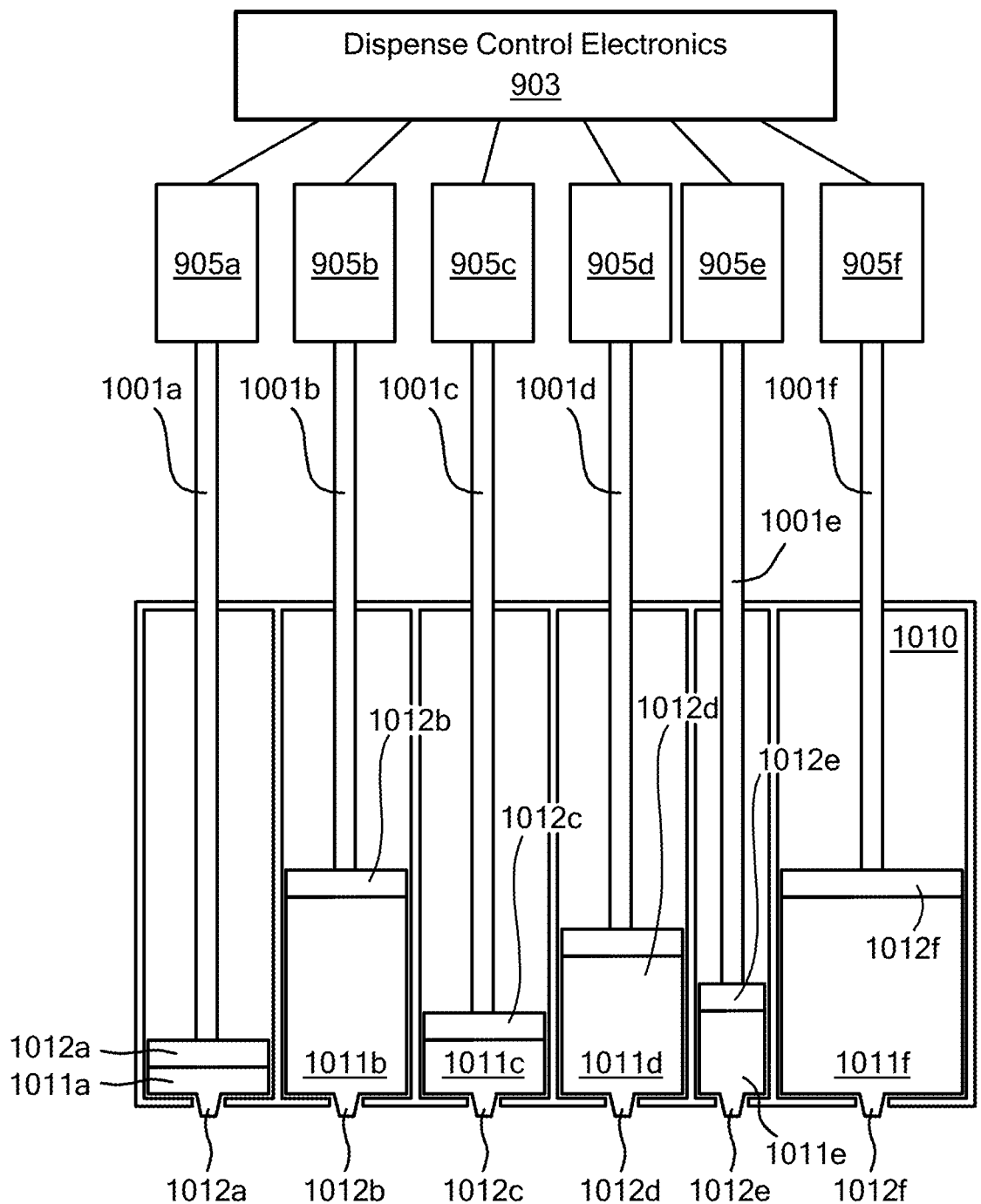
FIG. 10 is a diagrammatic representation of the coupling of the dispense actuation to the additive cartridge, in accordance with an embodiment of the present invention.

FIG. 10 is a diagrammatic representation of the coupling of the dispense actuation to the additive cartridge, in accordance with an embodiment of the present invention. The dispense control electronics 903 send signals to the dispense actuators 905*a*-905*f.* Six actuators are shown here, although many more actuators can be incorporated, depending on the specific embodiment. A single actuator can also be moved from one additive to another using another actuator, reducing the total number of actuators for cartridges with high numbers of pigments. Each actuator 905*a*-905*f* is capable of producing rotary or translational displacements, or both. Each actuator is coupled to the cartridge via a corresponding mechanical linkage 1001*a*-1001*f.* These mechanical linkages couple the actuator displacements to the cartridge 1010. The cartridge 1010 includes a corresponding number of individual chambers 1011*a*-1011*f,* each of which holds a different additive. Each additive is sealed in its chamber by a corresponding piston 1012*a*-1012*f,* e.g., with a sliding or bellows seal. The motion of the actuator works on the linkage to produce a displacement of the piston and to cause the calculated amount of additive to leave the chamber through its respective nozzle 1012*a*-1012*f.* This system is in contrast to previous systems which rely on separate pumps and reservoirs (e.g. patent U.S. Pat. No. 5,903,465).

Figure 11:
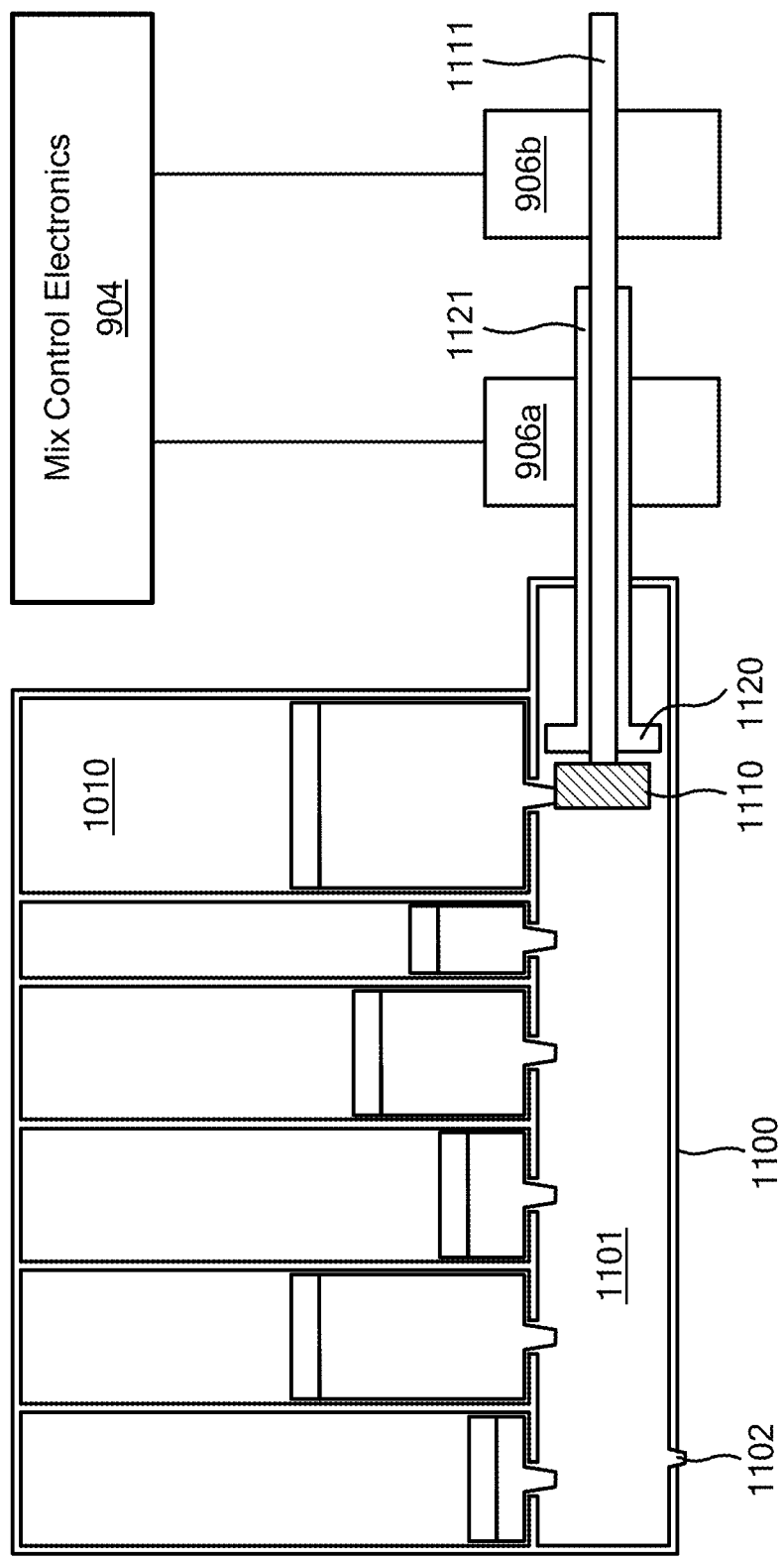
FIG. 11 is an embodiment of the mixing and dispensing system with associated actuation, in accordance with an embodiment of the present invention.

FIG. 11 is an embodiment of the mixing and dispensing system with associated actuation, in accordance with an embodiment of the present invention. The mixer 1100 is attached to the additive cartridge 1010 so that pigment dispensed from the cartridge flows into the mixing chamber 1101. The mix control electronics 904 provide signals to the actuators 906*a* and 906*b*. Each actuator is able to produce rotational and/or translational displacements of the piston 1120 and agitator 1110. The piston 1120 and agitator 1110 work within the mixing chamber 1101 to combine the additives into a homogeneous fluid. Once mixed, the fluid is dispensed from the mixing chamber 1101 through the dispense nozzle 1102 by the combined motion of the agitator 1110 and the piston 1120. The forces on the dispense pistons prevent mixed fluid from re-entering the additive reservoirs. Relatively high fluid viscosity and a relatively small nozzle diameter prevent the fluid from leaking from dispense nozzle 1102 before the dispensing.

Figure 12:
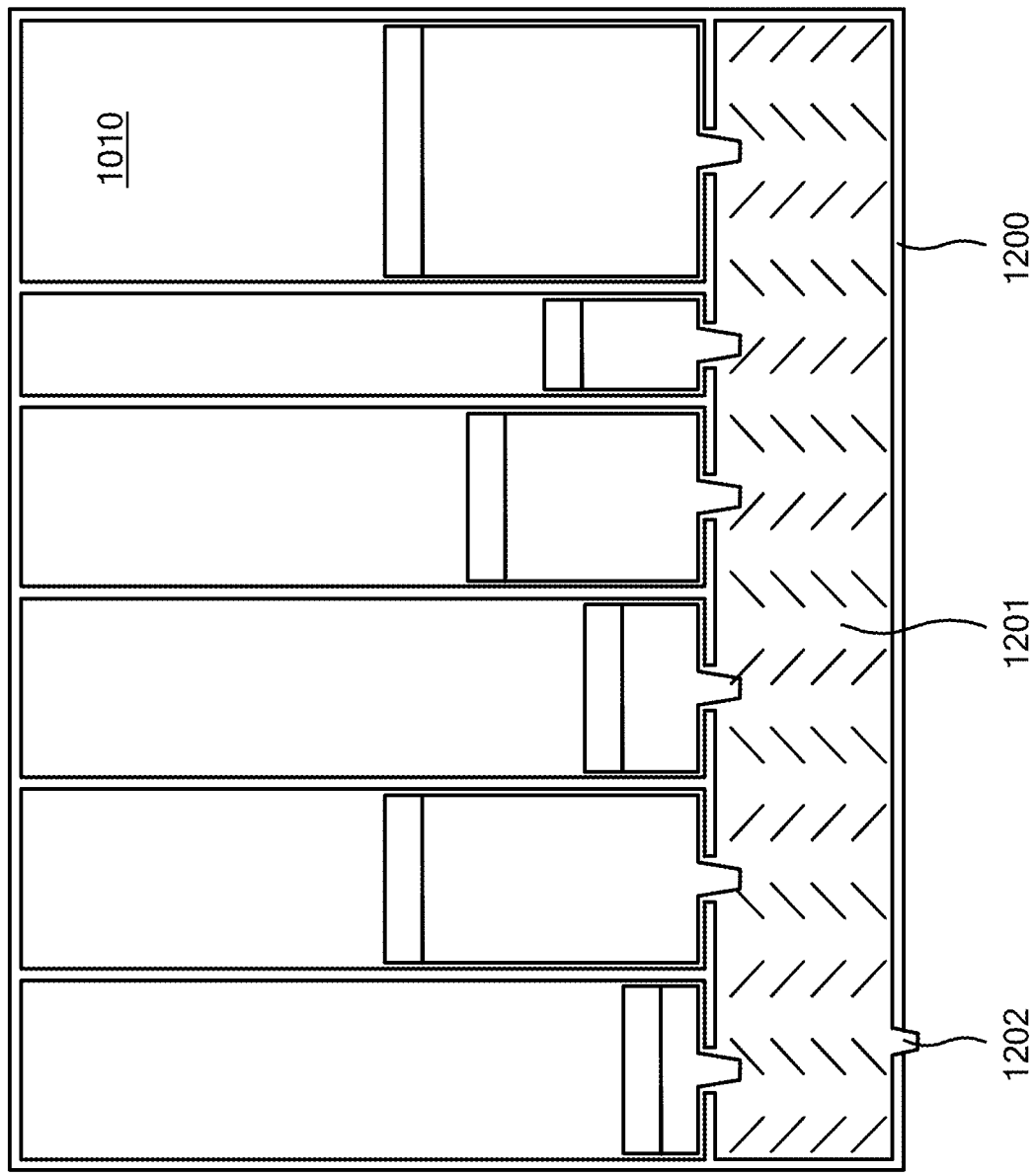
FIG. 12 is a diagrammatic representation of an embodiment of the invention showing a static mixer, that is, a mixer that does not rely on additional moving parts, to cause the additives to mix.

FIG. 12 is a diagrammatic representation of another embodiment of the invention showing a static mixer, that is, a mixer that does not rely on additional moving parts, to cause the additives to mix. In this embodiment, the additives, as they exit the cartridge 1010, are forced into the mixer 1200 through a series of vanes or turbulators 1201 which churn the additives together as they are dispensed into the mixer 1200, and continuously out the dispense nozzle 1202.

Figure 13:
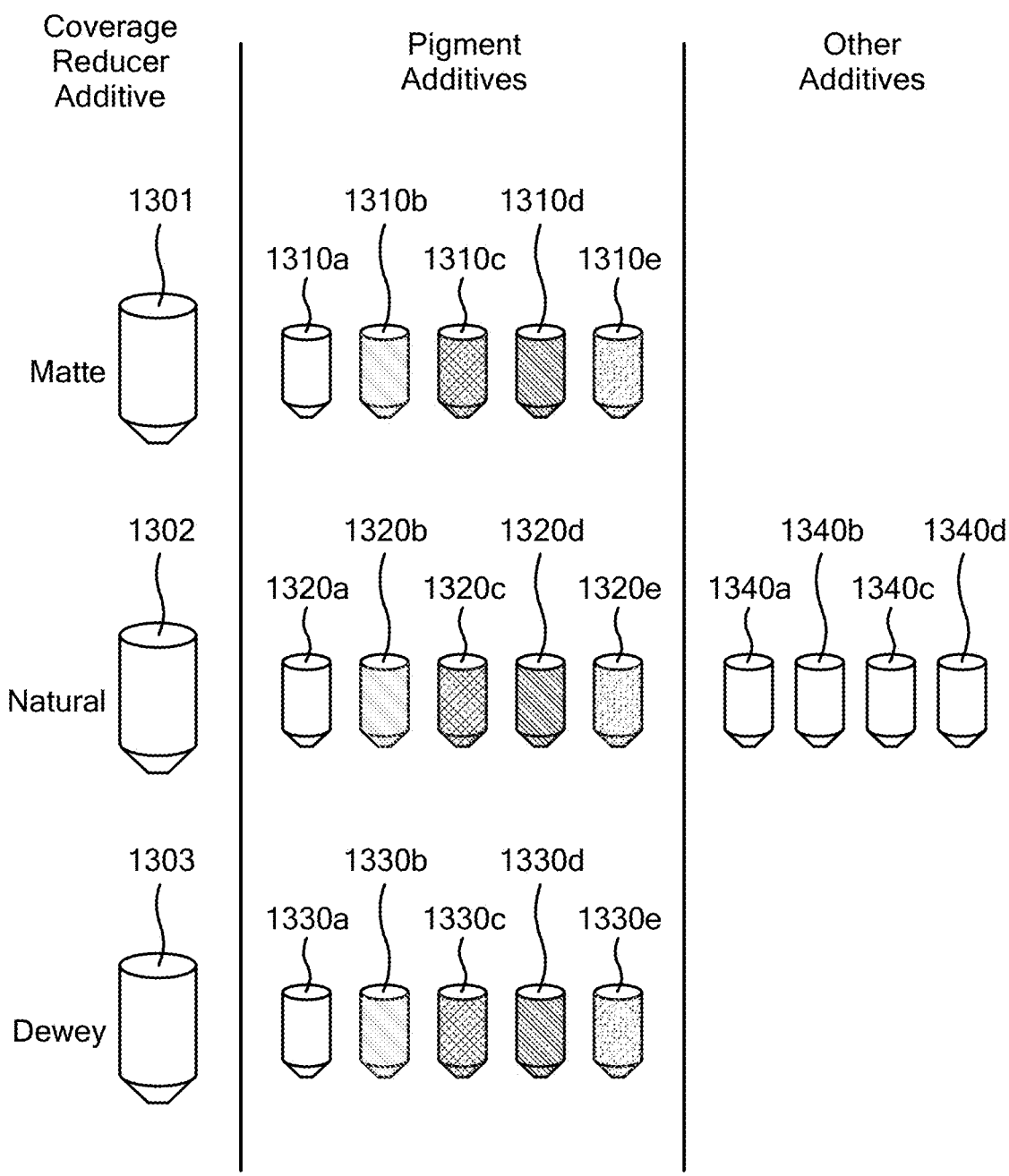
FIG. 13 is a diagram of an embodiment of the present invention showing a modular cosmetic chemistry with an array of additives that can be mixed to achieve a custom color, coverage and finish.

FIG. 13 is a diagram of an embodiment of the present invention showing a modular cosmetic chemistry with an array of additives that can be mixed to achieve a custom color, coverage and finish. In this embodiment, coverage reducer additives 1301, 1302, 1303 and their associated pigment additives 1310a-1310e, 1320a-1320e, 1330a-1330e are formulated as typical silicone-water emulsion foundations (see patents U.S. Pat. Nos. 5,965,112, 5,800,816 A, 4,988,503, which are hereby incorporated herein by reference in their entirety). Further, other than the ratios of pigments and mineral fillers, the pigment and coverage reducer additives are identical to other additives within a given finish. Other additives 1340a-1340d may contain UV protective ingredients, vitamins, or other skincare ingredients. Each of the color additives 1310a-e, 1320a-e, 1330a-e is formulated specifically to produce the desired finish. For each finish there are five color additives, a white additive 1310a, 1320a, 1330a incorporating titanium dioxide and/or zinc oxide. The yellow, red and black color additives 1310b, 1310c, 1310e, 1320b, 1320c, 1320e, 1330b, 1330c, 1330e, are each formulated with iron oxide pigments. The blue color additives 1310d, 1320d, 1330d are essential to matching very light and very deep skin tones. These additives are formulated with an ultramarine pigment or other blue pigment. The coverage reducer additives 1301, 1302, 1303 are used to reduce the total pigment concentration, and hence decrease the coverage of the resulting mix. To produce a custom cosmetic of a desired finish, matte for example, the portioning system would combine coverage reducer additive 1301 with pigments 1310a-1310e in proportions dictated by the color recipe, add any of the other additives 1340l-1340d, mix and dispense.

Figure 14:
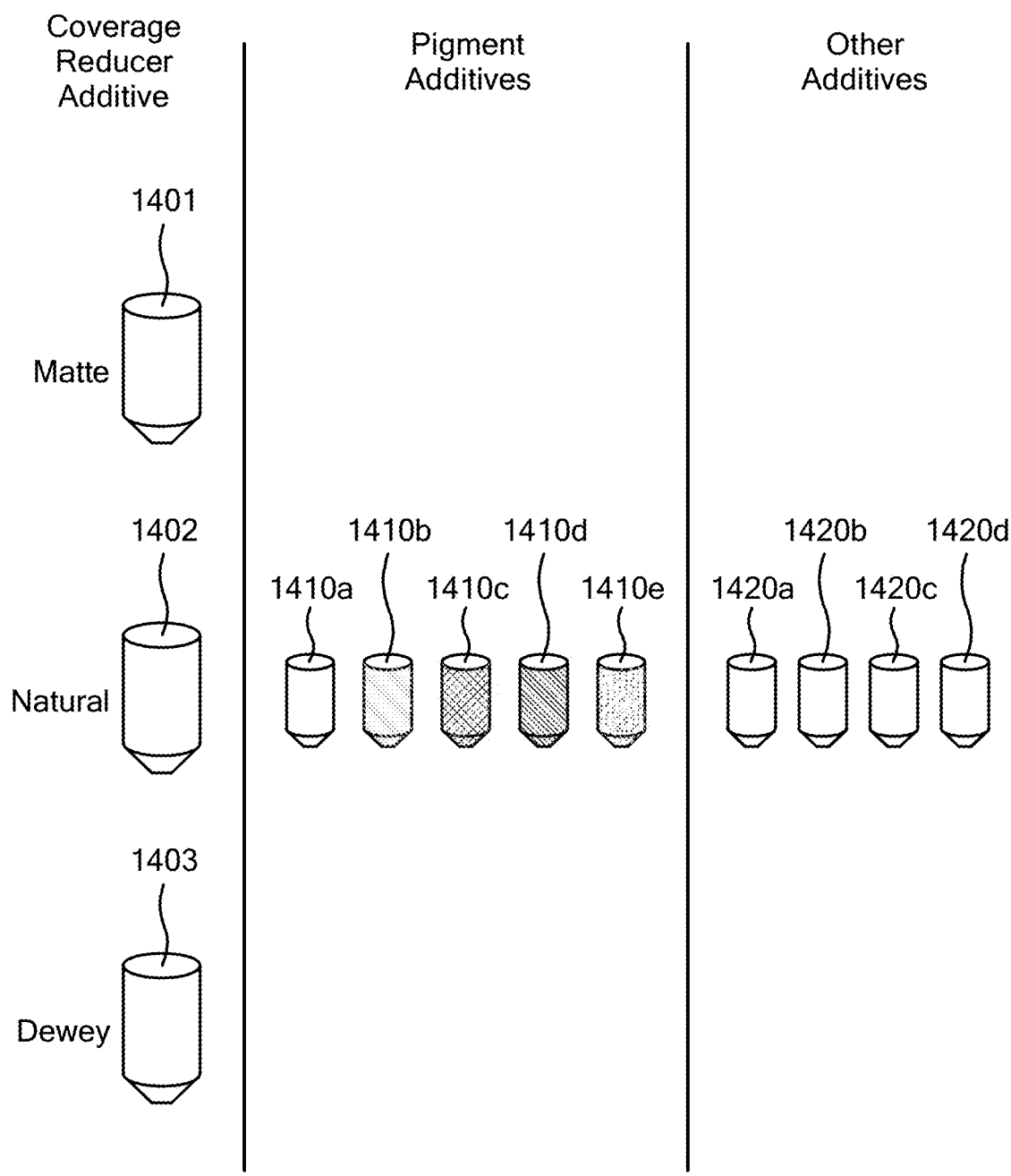
FIG. 14 is a diagram showing an alternate embodiment, of the present invention, of the modular cosmetic chemistry with an array of additives that can be mixed to achieve a custom color, coverage and finish.

FIG. 14 is a diagram showing an alternate embodiment, of the present invention, of the modular cosmetic chemistry with an array of additives that can be mixed to achieve a custom color, coverage and finish. In this embodiment, the coverage reducer additives 1401, 1402, 1403 are formulated as typical silicone-water emulsion foundations (see patents U.S. Pat. Nos. 5,965,112, 5,800,816 A, 4,988,503, which are hereby incorporated herein by reference in their entirety). The pigment additives 1410a-1410e are formulated to have the highest pigment concentration by volume possible while allowing for ingredients that improve their miscibility in the coverage reducer additive. Other additives 1420a-1420d may contain, as above, UV protective ingredients, vitamins, or other skincare ingredients. Also as before, there are five color additives, a white additive 1410a, incorporating titanium dioxide and/or zinc oxide. The yellow, red and black color additives 1410b, 1410c, 1410e, are each formulated with iron oxide pigments. The blue color additive 1410d is formulated with an ultramarine pigment, or other blue pigment. The coverage reducer additives 1401, 1402, 1403 are used to offset the total pigment concentration when a decrease in coverage of the resulting mix is desired. To produce a custom cosmetic of a desired finish, matte for example, the portioning system would combine coverage reducer additive 1401 with pigments 1410a-1410e in proportions dictated by the color recipe, add any of the other additives 1420a-1420d, mix and dispense.

Figure 15:
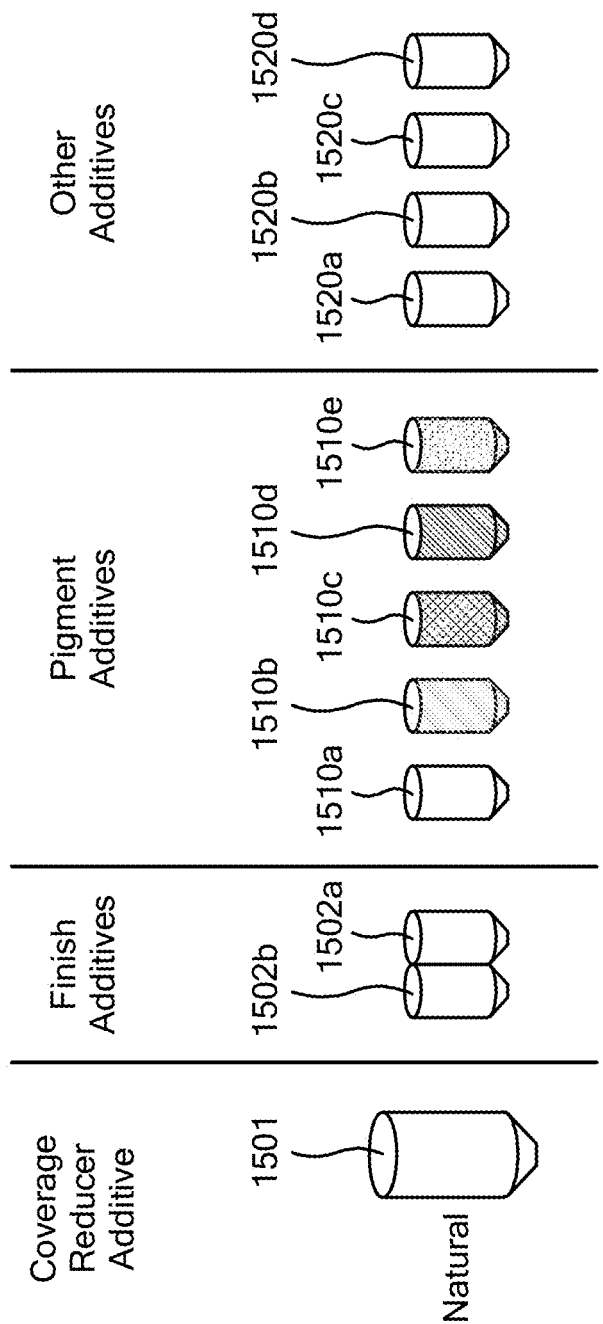
FIG. 15 is a diagram, showing an alternate embodiment of the present invention, wherein the modular cosmetic chemistry is provided with an array of additives that can be mixed to achieve a custom color, coverage and finish.

FIG. 15 is a diagram, showing an alternate embodiment of the present invention, wherein the modular cosmetic chemistry is provided with an array of additives that can be mixed to achieve a custom color, coverage and finish. In this embodiment, the coverage reducer additive 1501 is formulated as typical silicone-water emulsion foundations with a natural finish (see patents U.S. Pat. Nos. 5,965,112, 5,800, 816 A, 4,988,503, which are hereby incorporated herein by reference in their entirety). The finish additives 1502a and 1502b are formulated to adjust finish of the natural foundation. Addition of a higher percentage of 1502b in will make the resulting finish more dewy. Addition of a higher percentage of 1502a will make the resulting finish more matte. The pigment additives 1510a-1510e are formulated to have the highest pigment concentration by volume possible while allowing for ingredients, which improve their miscibility in the coverage reducer additive. Other additives 1520a-1520d may contain, as above, UV protective ingredients, vitamins, or other skincare ingredients. Also as before, there are five color additives, a white additive 1510a, incorporating titanium dioxide and/or zinc oxide. The yellow, red and black color additives 1510b, 1510c, 1510e, are each formulated with iron oxide pigments. The blue color additive 1410d is formulated with an ultramarine pigment, or other blue pigment. The coverage reducer additives 1401, 1402, 1403 are used to offset the total pigment concentration when a decrease in coverage of the resulting mix is desired. To produce a custom cosmetic of a desired finish, matte for example, the portioning system would combine coverage reducer additive 1501 with a quantity of 1502a necessary to achieve the desired finish and add pigments 1510a-1510e in proportions dictated by the color recipe, add any of the other additives 1520a-1520d, mix and dispense.

Figure 16:
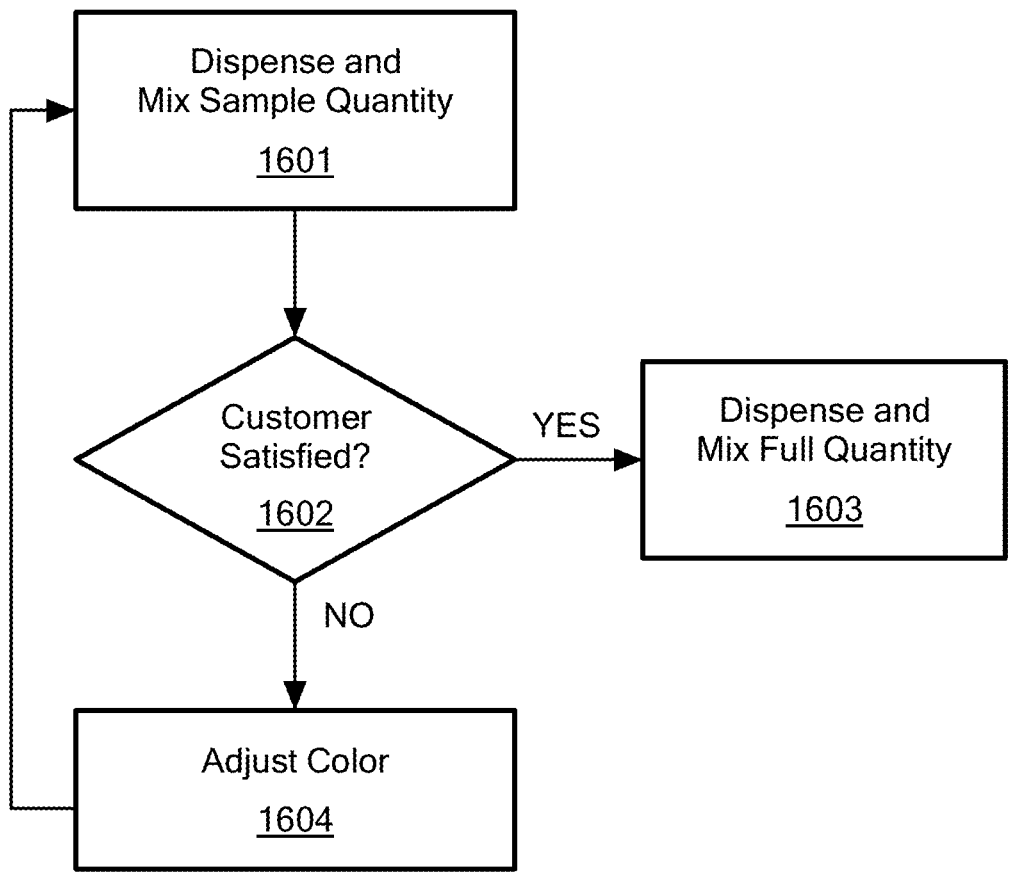
FIG. 16 is a flow chart of an embodiment of the invention that allows a user to select a color according to the user's preference.

FIG. 16 is a flow chart of an embodiment of the invention that allows a user to select a color according to the user's preference. Once a sample has been formulated in process 1601, the customer applies the sample and decides if s/he is satisfied. If so, s/he can choose in process 1602 via the smart device application user interface, to make the final full volume of product in process 1603. If s/he is not satisfied, the application will allow the user to choose a color change in process 1604, and start again with another sample in process 1601.

Figure 17:
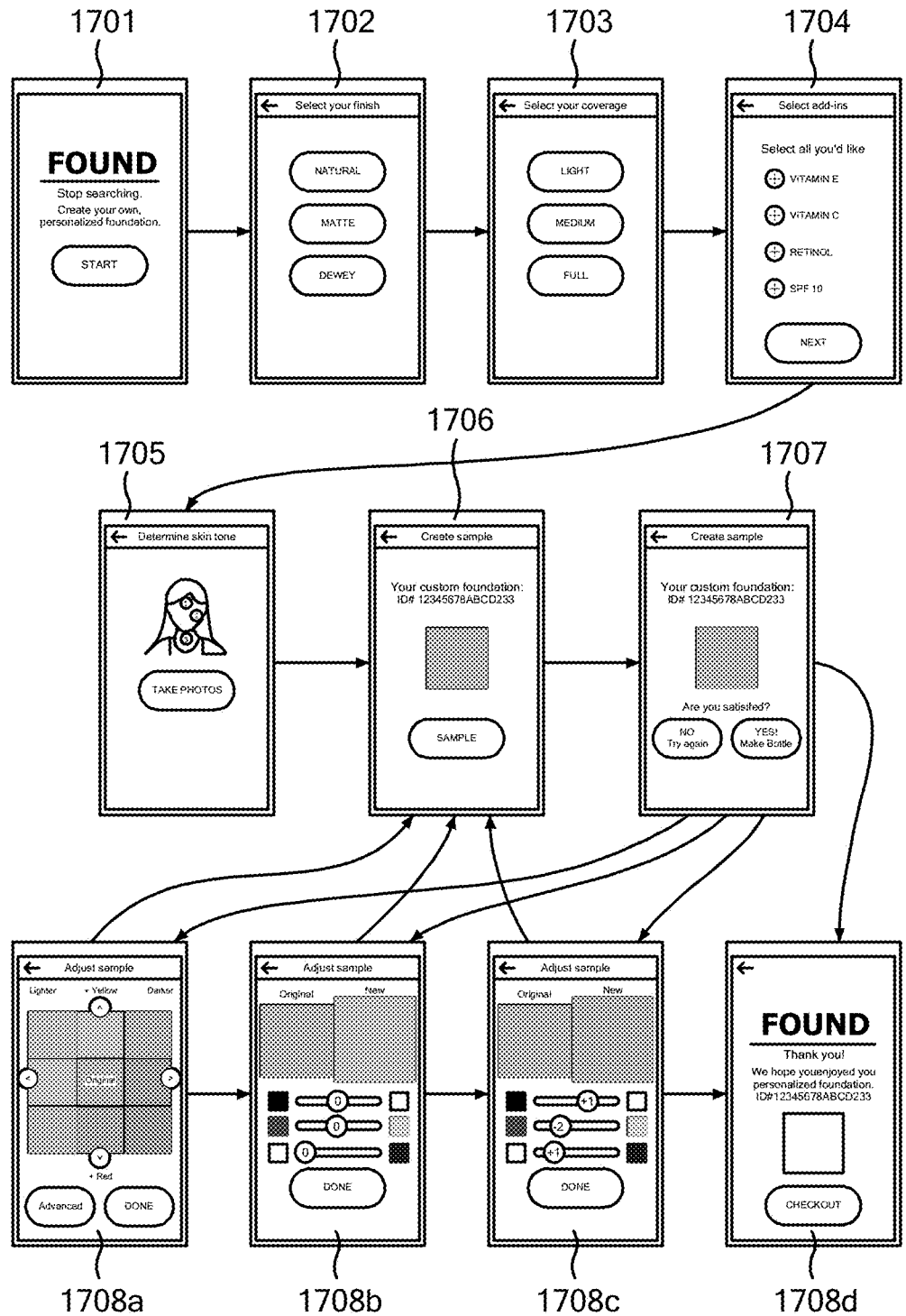
FIG. 17 is a diagram, in accordance with an embodiment of the present invention, showing a typical embodiment of a user interface for the color measurement and customization system.

FIG. 17 is a diagram, in accordance with an embodiment of the present invention, showing a typical embodiment of a user interface for the color measurement and customization system. A user interaction for the skin color measurement and customization system described above is as follows. A start screen 1701 allows the user to begin a new interaction. The user then selects the desired finish on the next screen 1702, s/he selects coverage on screen 1703, and additional additives on screen 1704. The user is then directed to measure skin pigmentation at various places, e.g., on or around the user's face, neck, or jaw via screen 1705. Once the measurement has been made, the user is presented with screen 1706, which presents the user's customized, calibrated color and allows the user to instruct the application to instruct the portioning machine to formulate a sample of this color. Then begins the recursive trial and adjust process described in FIG. 16. If the sample is satisfactory, the user can indicate so on screen 1707, which directs the user to a final screen where payment can be made for a full quantity of the color as the custom foundation is being produced by the portioning machine. If the user is unsatisfied with the sample color, then the user may choose, on screen 1707, to adjust the color using screens 1708a, 1708b, 1708c, each of which offer a different method for further customizing the desired color. The user can swipe between these screens. When the desired color customization is made, the user is returned to screen 1706 to print another sample. The process repeats until the customer is satisfied with the shade.

Figure 18:
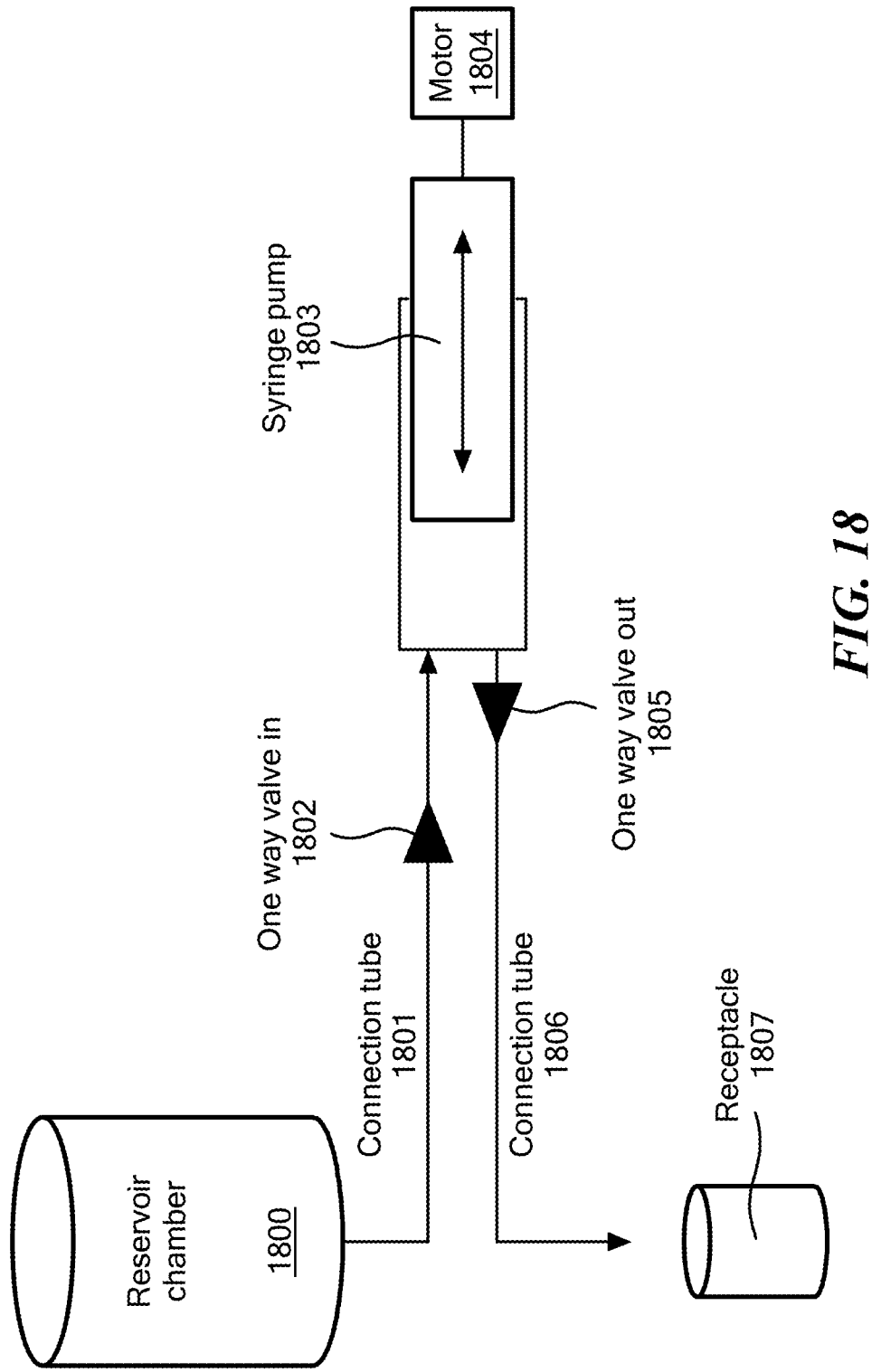
FIG. 18 shows an alternative embodiment of the mixing and dispensing system including two one-way valves.

In an alternative embodiment of the mixing and dispensing system of FIGS. 10-12, as shown in FIG. 18, two one-way valves couple together a reservoir chamber, a syringe pump, and a receptacle for receiving the customized cosmetic. In such a configuration, the reservoir chamber can hold a large amount of the pigment or other fluid (e.g. 100 or 1000 milliliters), while the syringe is sized and configured to operate on smaller amounts of the pigment (e.g. 3-7 milliliters etc.). The reservoir chamber 1800 is a container that holds fluids that are to be dispensed in the making of a customized cosmetic product. The reservoir chamber may be a bottle, box, bag, or other container that holds fluids. The reservoir chamber is connected by a tube 1801 to a one-way valve 1802. The one-way valve 1802 allows fluid to be transferred from the reservoir chamber 1800 to a syringe pump 1803. For this reason, the one-way valve 1802 may be referred to as an "inlet" valve. Fluid enters the syringe pump 1803 when the syringe is pulled back to draw in fluid. The syringe pump 1803 operates under the control of a motor 1804. The motor 1804 is controlled by a computer or other controller (not shown) that causes the pushing and pulling of the syringe pump 1803 to draw fluid in to the syringe 1803 or to push fluid out of the syringe 1803. The syringe pump 1803 is coupled to a second one-way valve 1805 that allows fluid to be directed out of the syringe 1803 through a connection tube 1806 and to a desired receptacle 1807. For this reason, the one-way valve 1805 may be referred to as an "outlet" valve. The receptacle 1807 may be a bottle or other container used for holding a customized cosmetic product. Thus, the system operates first to draw fluid into the syringe pump 1803 from the receptacle 1800 through the inlet valve 1802 and secondly to push the fluid out of the syringe pump 1803 through the outlet valve 1805 into the receptacle 1807. Once the fluid is placed in the receptacle 1807, the fluid may undergo further mixing with other fluids that are also dispensed into the receptacle 1807 to construct the customized cosmetic product. The configuration of this system provides for less refilling of the fluid reservoir chamber, and the system can operate to create customized cosmetics for multiple users without requiring the reservoir tank to be refilled or replaced.

Although FIG. 18 shows only a single syringe pump, in many practical applications, there would be a plurality of syringe pumps wherein each syringe pump 1803 may be connected to a separate reservoir chamber 1800 via a separate inlet valve 1802, and the outlet valves 1805 associated with the syringe pumps 1803 may be connected to a common receptacle 1807 so that fluids from multiple syringe pumps 1803 can be combined in the receptacle 1807. Each syringe pump 1803 may be actuated individually by the computer or controller to draw in and/or push out a predetermined amount of fluid for a given recipe, thereby allowing different mixtures of fluids from the reservoir chambers 1800 to be produced.

It should be understood by one of ordinary skill in the art that in any of the above-referenced embodiments, the portioning machine may include one or more slots configured to receive one or more cartridges. FIG. 10 shows a single cartridge 1010 that includes multiple chambers, each containing a specific additive, although it should be noted that in various alternative embodiments, each chamber or subset of chambers may be provided as a separate cartridge. Such cartridges generally include at least part of the dispensing mechanism (e.g., piston 1012 with or without mechanical linkage 1001 and/or actuator 905 as in FIG. 10, or syringe pump 1803 with or without motor 1804 as in FIG. 18). Such cartridges generally also include a reservoir for each chamber for holding and dispensing a particular additive, although cartridges can be configured without a reservoir, e.g., to allow for larger reservoirs to be accommodated.

Figure 19:
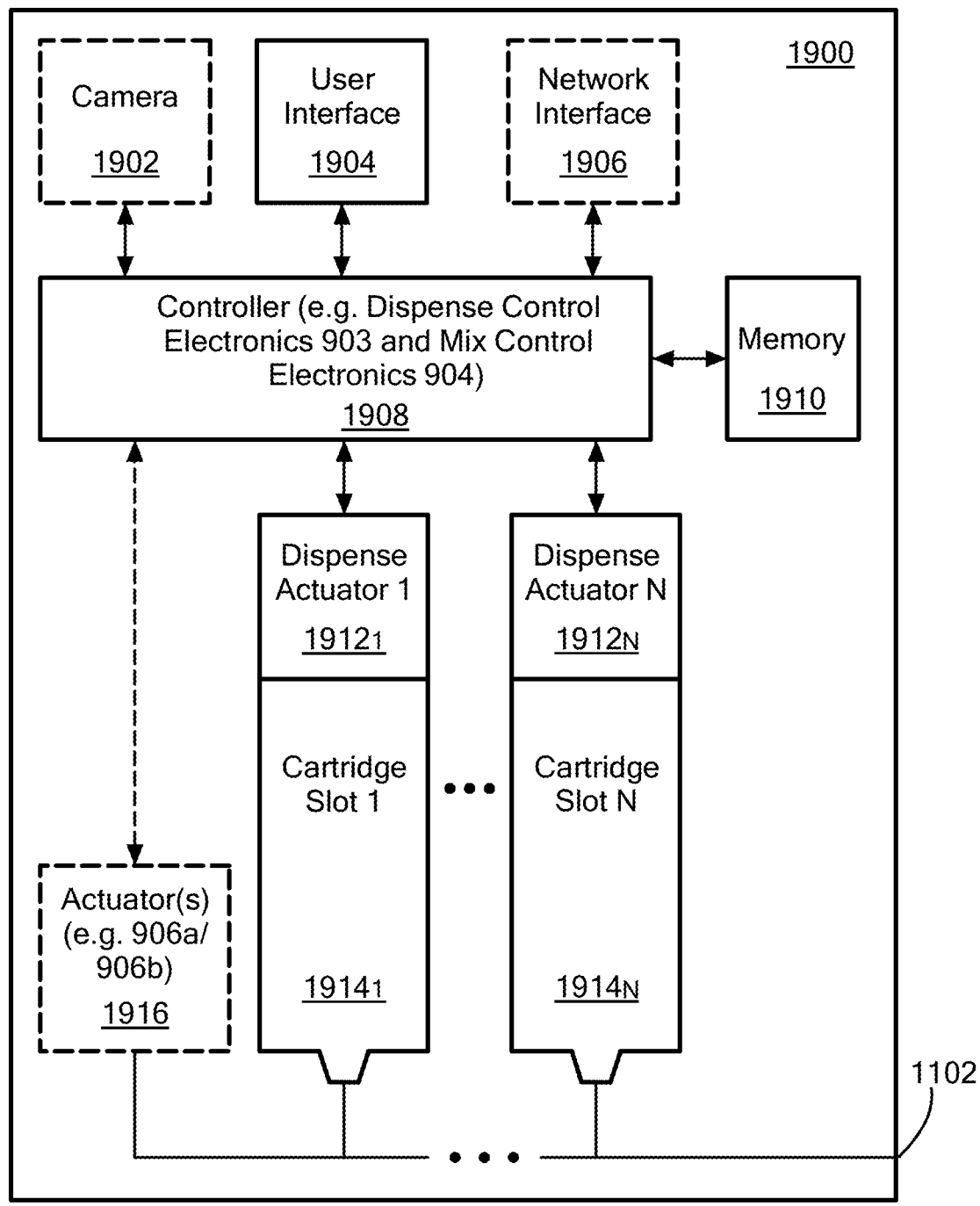
FIG. 19 is a schematic block diagram showing a portioning machine in accordance with certain exemplary embodiments configured to use cartridges containing syringe pumps of the type shown in FIG. 18.

FIG. 19 is a schematic block diagram showing a portioning machine 1900 in accordance with certain exemplary embodiments configured to use cartridges containing syringe pumps of the type shown in FIG. 18. Among other things, the portioning machine 1900 includes a controller 1908, a plurality of cartridge slots 1914 configured to receive individual cartridges (described below), and for each cartridge slot, a dispense actuator 1912 (e.g., motor 1804 as in FIG. 18). The controller 1908 is configured to control the dispensing operations as described above (e.g., with reference to the dispense control electronics 903) by controlling the dispense actuators 1912 and optionally also to control the mixing operations as described above (e.g., with reference to the mix control electronics 904) by controlling the optional mixing actuator(s) 1916. The controller 1908 may be configured to pull recipes from memory 1910 and/or from a remote source via an optional network interface 1906. The controller 1908 may be configured to perform the color measurement and customization operations as discussed above using an optional in-built camera 1902 and/or by receiving image information captured by an external device, e.g., via optional network interface 1906. A user interface 1904 is generally provided. The user interface 1904 may be used to make manual entries to the controller 1908 and may be used by the controller 1908 to provide status information to the user, e.g., process status, cartridge status, etc. Ultimately, the portioning machine 1900 can output customized formulations via outlet 1102.

Figure 20:
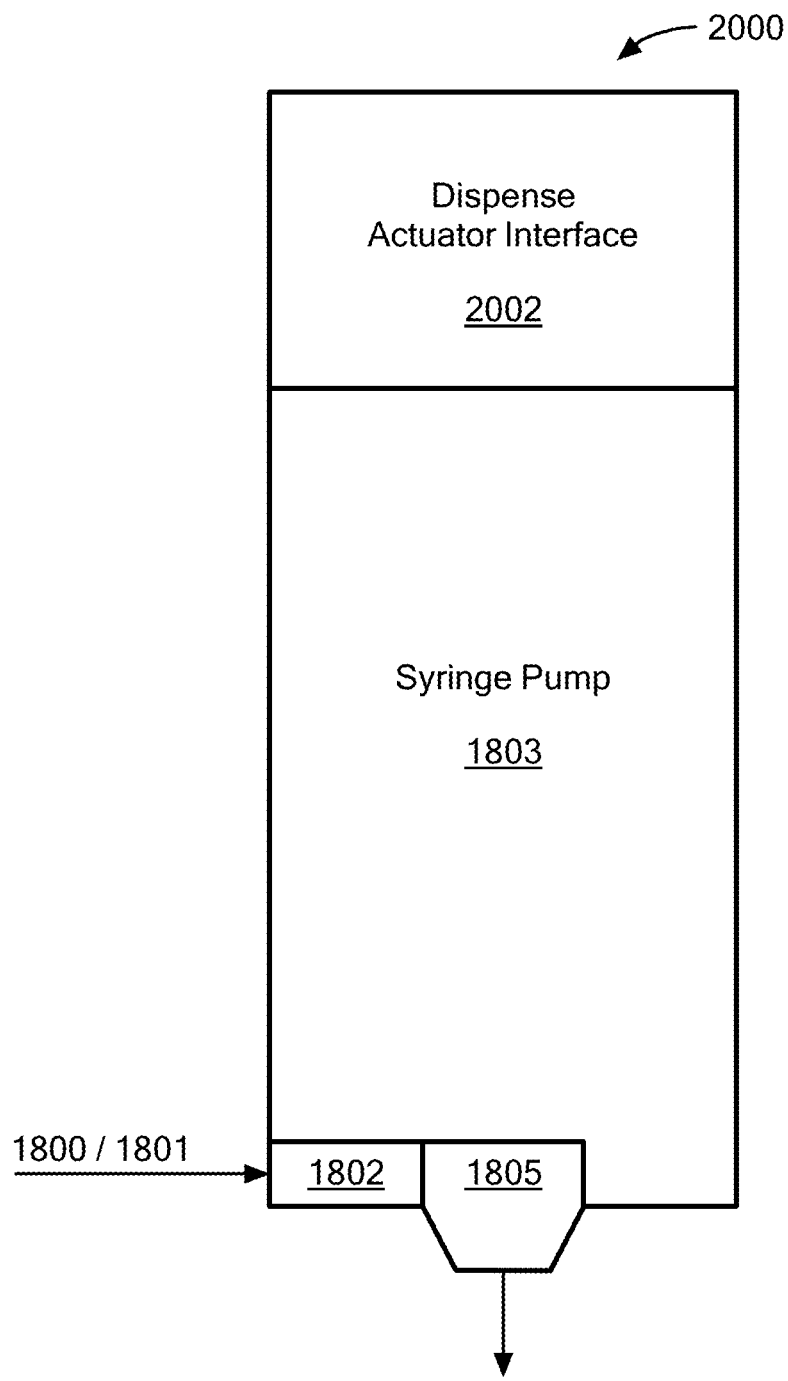
FIG. 20 is a schematic block diagram of first type of cartridge configured for use in the portioning machine of FIG. 19, in accordance with various exemplary embodiments.

FIG. 20 is a schematic block diagram of first type of cartridge 2000 configured for use in the portioning machine 1900 of FIG. 19, in accordance with various exemplary embodiments. The cartridge 2000 is configured to fit into a cartridge slot 1914 of the portioning machine 1900. Each cartridge slot 1914 may be "keyed" to only accept a cartridge having a corresponding "key" in order to prevent the wrong cartridge from being inserted into the wrong cartridge slot 1914. The cartridge 2000 includes a dispense actuator interface 2002 that is configured to interface with the corresponding dispense actuator 1912 of the portioning machine 1900. The cartridge 2000 also includes a syringe pump 1803, a one-way inlet valve 1802, and a one-way outlet valve 1805 configured to operate substantially as discussed above with reference to FIG. 18. In this exemplary embodiment, the inlet valve 1802 is configured to connect to an external reservoir chamber 1800 via external tubing 1801.

Figure 21:
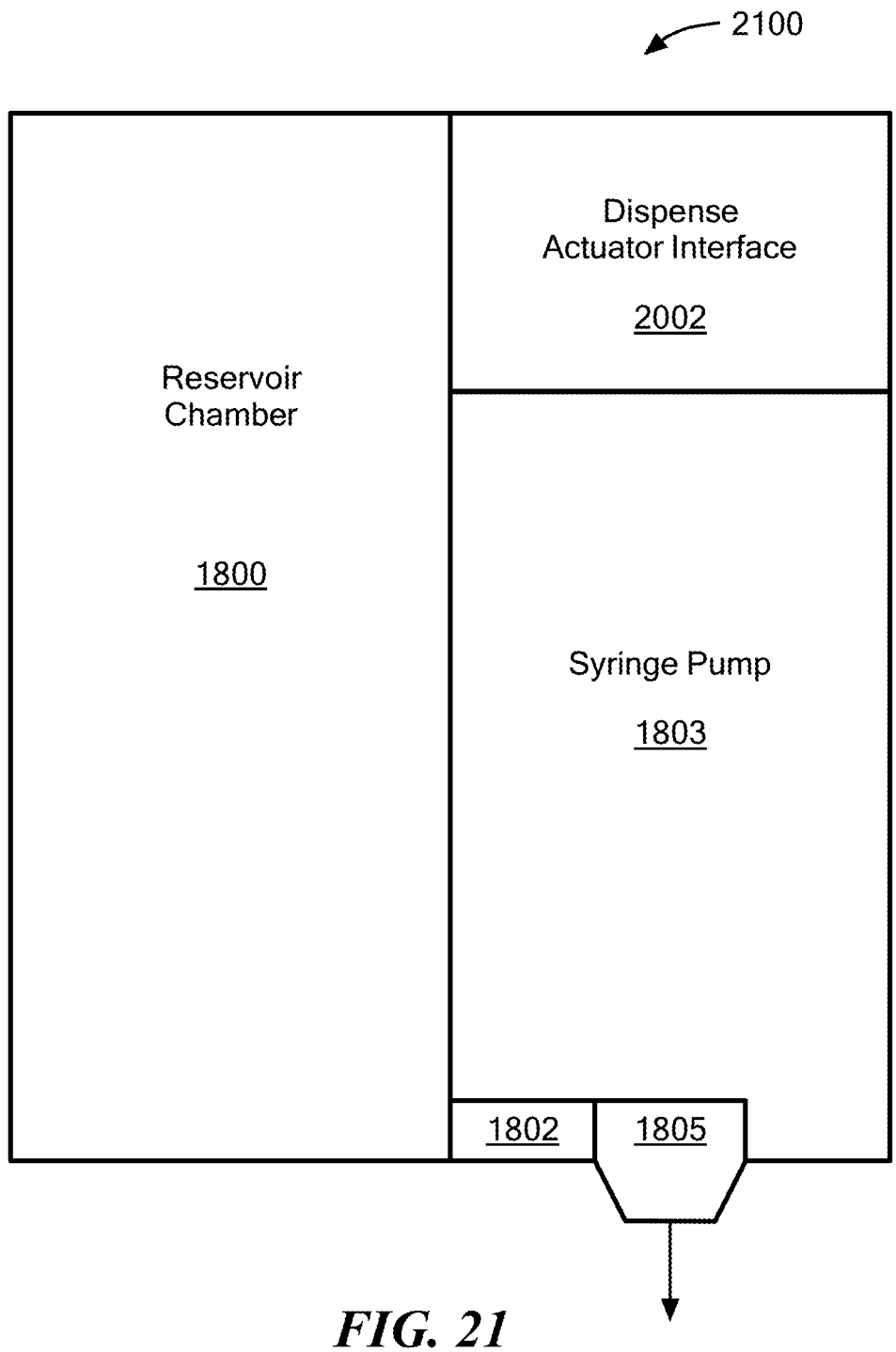
FIG. 21 is a schematic block diagram of second type of cartridge configured for use in the portioning machine of FIG. 19.

FIG. 21 is a schematic block diagram of second type of cartridge 2100 configured for use in the portioning machine 1900 of FIG. 19, in accordance with various exemplary embodiments. Cartridge 2100 includes all of the components of cartridge 2000, and additionally includes a reservoir chamber 1800 having an outlet connected to the inlet valve 1802 to allow fluid from the reservoir chamber 1800 to be drawn into the syringe pump 1803.

Figure 22:
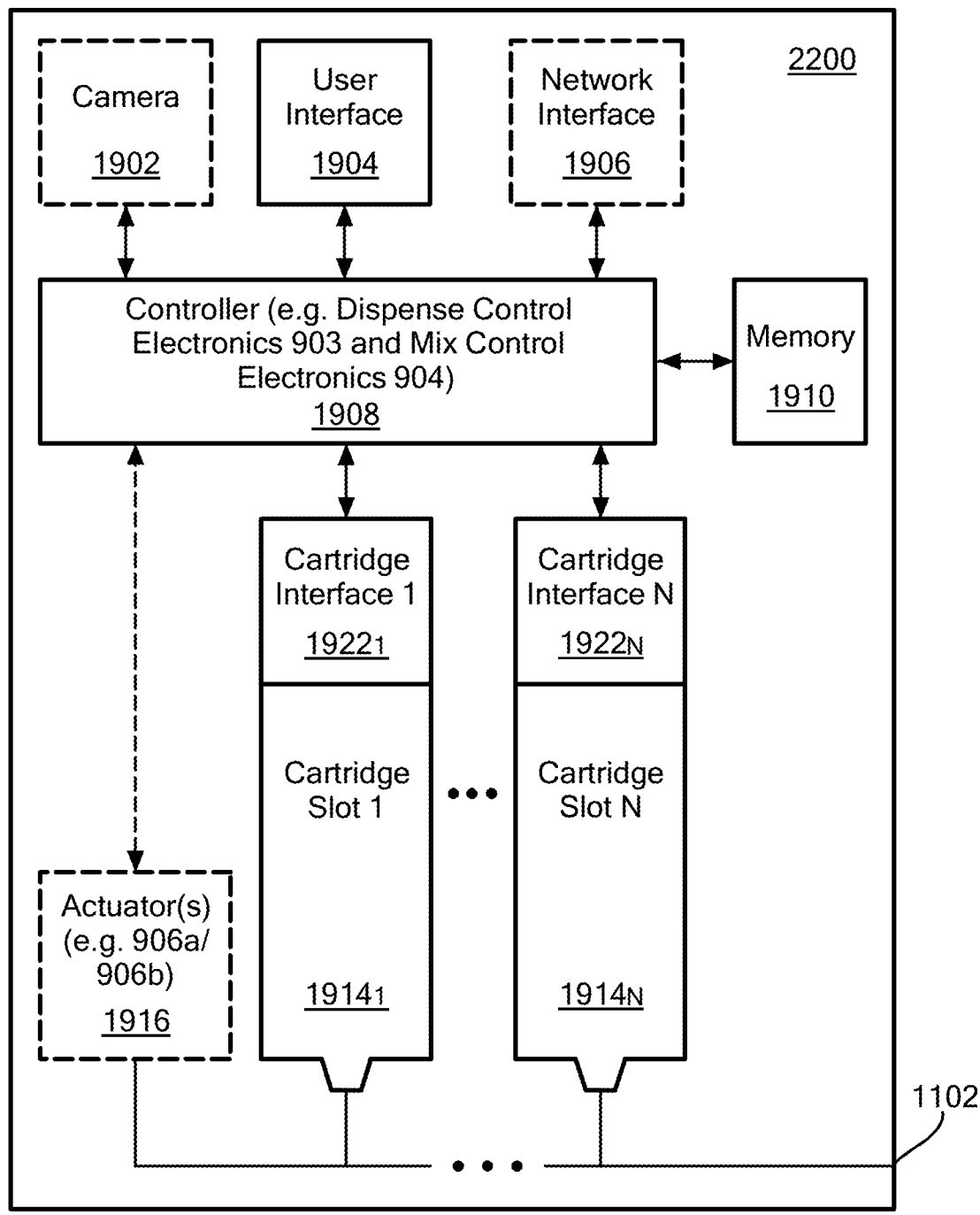
FIG. 22 is a schematic block diagram showing a portioning machine in accordance with certain exemplary embodiments configured to use cartridges containing syringe pumps of the type shown in FIG. 18.

FIG. 22 is a schematic block diagram showing a portioning machine 2200 in accordance with certain exemplary embodiments configured to use cartridges containing syringe pumps of the type shown in FIG. 18. Among other things, the portioning machine 2200 includes a controller 1908, a plurality of cartridge slots 1914 configured to receive individual cartridges (described below), and for each cartridge slot, a cartridge interface 1922 (e.g., an electrical interface configured to provide electrical signals between controller 1908 and a cartridge installed in the cartridge slot 1914). The controller 1908 is configured to control the dispensing operations as described above (e.g., with reference to the dispense control electronics 903) by sending electrical signals to each cartridge via the corresponding cartridge interface 1912 and optionally also to control the mixing operations as described above (e.g., with reference to the mix control electronics 904) by controlling the optional mixing actuator(s) 1916. The controller 1908 may be configured to pull recipes from memory 1910 and/or from a remote source via an optional network interface 1906. The controller 1908 may be configured to perform the color measurement and customization operations as discussed above using an optional in-built camera 1902 and/or by receiving image information captured by an external device, e.g., via optional network interface 1906. A user interface 1904 is generally provided. The user interface 1904 may be used to make manual entries to the controller 1908 and may be used by the controller 1908 to provide status information to the user, e.g., process status, cartridge status, etc. Ultimately, the portioning machine 2200 can output customized formulations via outlet 1102.

Figure 23:
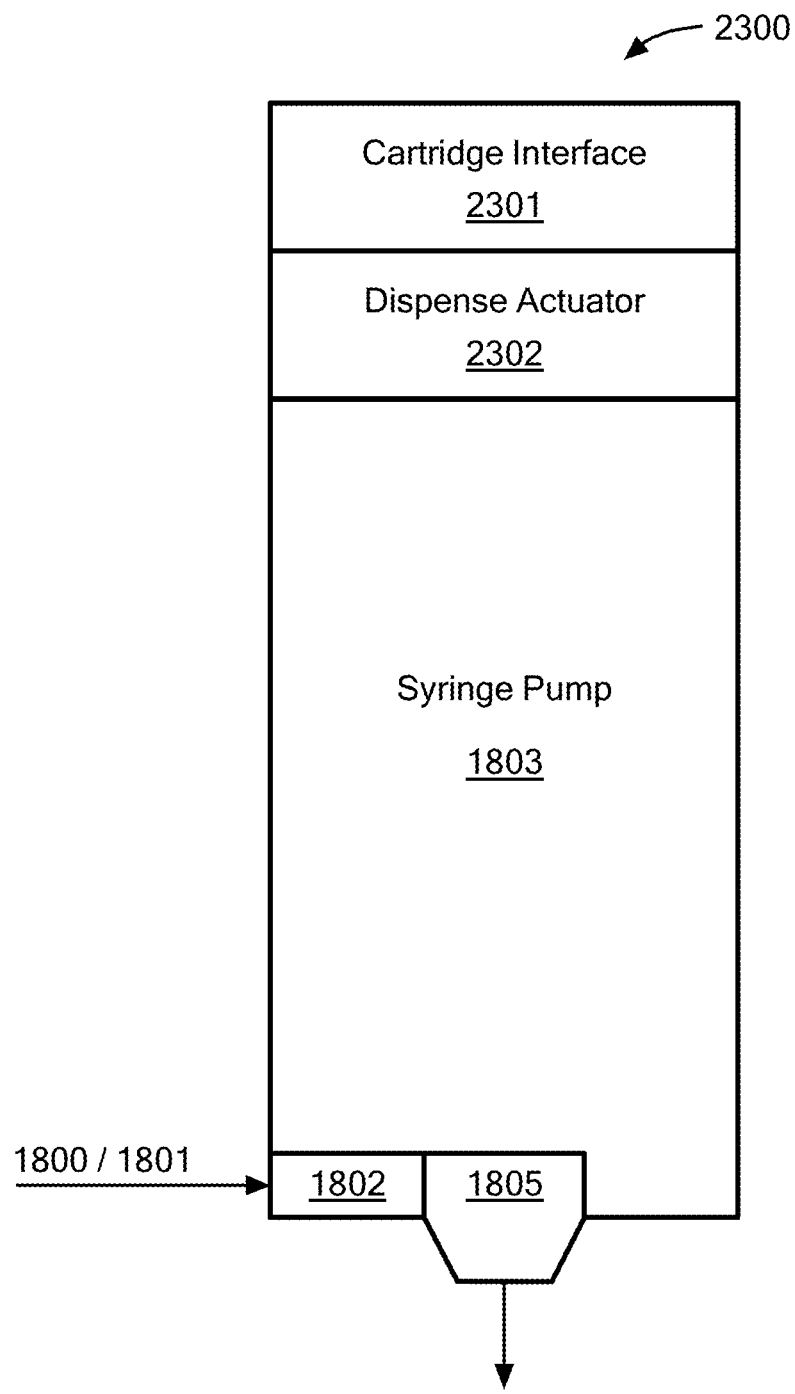
FIG. 23 is a schematic block diagram of first type of cartridge configured for use in the portioning machine of FIG. 22, in accordance with various exemplary embodiments.

FIG. 23 is a schematic block diagram of first type of cartridge 2300 configured for use in the portioning machine 2200 of FIG. 22, in accordance with various exemplary embodiments. The cartridge 2300 is configured to fit into a cartridge slot 1914 of the portioning machine 2200. Each cartridge slot 1914 may be "keyed" to only accept a cartridge having a corresponding "key" in order to prevent the wrong cartridge from being inserted into the wrong cartridge slot 1914. The cartridge 2300 includes a cartridge interface 2301 configured to interface with the cartridge interface 1922 of portioning machine 2200 and a dispense actuator 2302 (e.g., motor 1804) that is configured to be operated via the cartridge interface 2301. The cartridge 2300 also includes a syringe pump 1803, a one-way inlet valve 1802, and a one-way outlet valve 1805 configured to operate substantially as discussed above with reference to FIG. 18. In this exemplary embodiment, the inlet valve 1802 is configured to connect to an external reservoir chamber 1800 via external tubing 1801.

Figure 24:
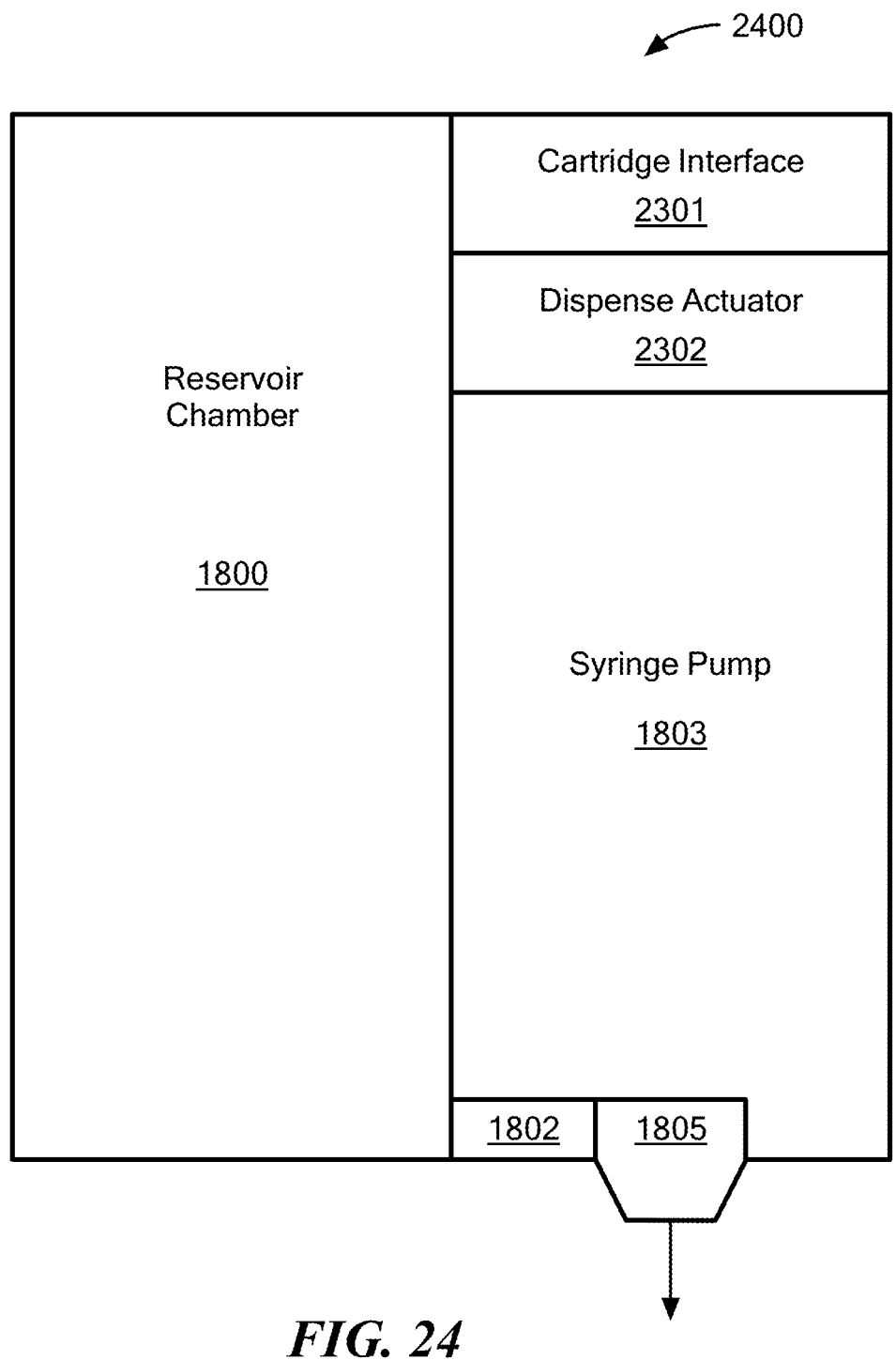
FIG. 24 is a schematic block diagram of second type of cartridge configured for use in the portioning machine of FIG. 22, in accordance with various exemplary embodiments.

FIG. 24 is a schematic block diagram of second type of cartridge 2400 configured for use in the portioning machine 2200 of FIG. 22, in accordance with various exemplary embodiments. Cartridge 2400 includes all of the components of cartridge 2300, and additionally includes a reservoir chamber 1800 having an outlet connected to the inlet valve 1802 to allow fluid from the reservoir chamber 1800 to be drawn into the syringe pump 1803.

Figure 25:
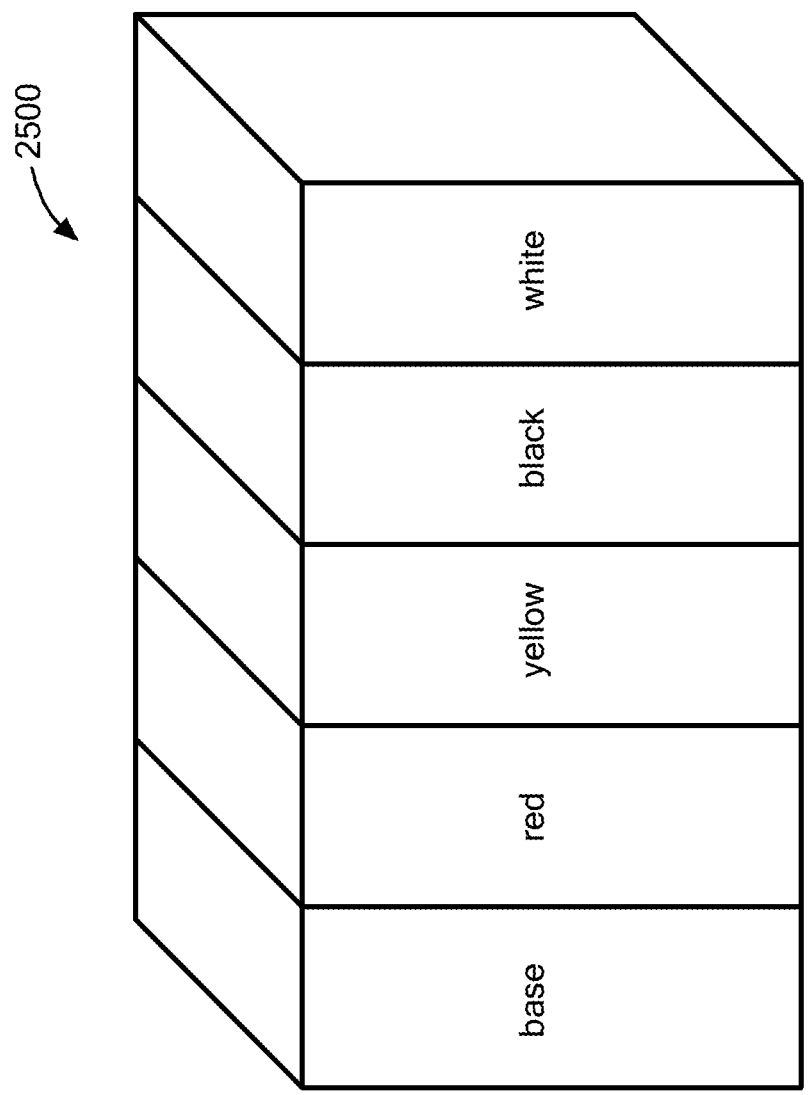
FIG. 25 is a schematic block diagram showing a holder configured to hold multiple reservoir chamber cartridges, in accordance with certain exemplary embodiments.

It also should be noted that, in various alternative embodiments, one or more reservoir chambers can be provided as a single cartridge, e.g., a single-color cartridge containing a single reservoir chamber or a multiple-color cartridge containing multiple reservoir chambers. The portioning machines 1900 and 2200 may be configured to include one or more reservoir chamber slots (not shown) with each reservoir chamber slot configured to receive a reservoir chamber cartridge, or the portioning machines 1900 and 2200 may be configured to include inlet ports configured to connect to external reservoir chambers via tubing or other conduit. In various alternative embodiments, multiple reservoir chamber cartridges may be provided or otherwise placed in a holder, for example, as shown schematically in FIG. 25. Here, a holder 2500 is configured to hold five cartridges, specifically a cartridge containing a base material, a cartridge containing red pigment, a cartridge containing yellow pigment, a cartridge containing black pigment, and a cartridge containing white pigment. In various alternative embodiments, the holder 2500 may be part of the portioning machine or may be separate from the portioning machine.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A method of determining color of skin of a subject, the method comprising:
  covering a region of skin with a chamber having an open area facing the skin;
  illuminating the skin with light caused to enter the chamber;
  causing dispersion of the light in the chamber;
  using a camera, positioned to have a light path from the chamber, to record an image of a portion of the dispersed light in the chamber; and
  processing the recorded image to characterize the skin color.

P2. The method according to claim P1, wherein the chamber is predominantly white.

P3. The method according to claim P1, wherein the chamber includes an integrating sphere in the light path.

P4. The method according to claim P1, wherein the camera is integrated into a mobile device and wherein the processing is performed by the mobile device.

P5. The method according to claim P1, wherein the chamber includes a plano-convex, bi convex or positive meniscus lens in the light path.

P6. The method according to claim P1, wherein the chamber is part of a housing and wherein the housing is physically coupled to a device that includes the camera.

P7. The method according to claim P6, wherein the device includes a flash and wherein the housing includes a light passage positioned over the flash.

P8. The method according to claim P6, wherein device is a mobile device.

P9. The method according to claim P1, wherein the camera has associated automatic camera settings and wherein using the camera to record the image comprises:
  disabling the automatic camera settings;
  setting a flash associated with the camera to a low intensity; and
  waiting a predetermined amount of time after setting the flash, in order for the light output thereof to stabilize, before capturing the image.

P10. The method according to claim P1, wherein processing the recorded image comprises:
  receiving RGB color values from the camera;
  mapping the received RGB color values to a CIE L a*b* color space;
  retrieving from memory CIE L a*b* coordinates for each of a plurality of stored color recipes; and
  identifying a closest match between the mapped RGB color values and a stored color recipe;
  wherein the closest match characterizes the skin color.

P11. The method according to claim P10, wherein processing further includes:
  receiving user input to alter the RGB color values in accordance with user preference.

P12. A method of providing a cosmetic having a desired color matched to skin of a subject, the method comprising:
  receiving a recipe of additives matched to the skin color of the subject;
  calculating, based upon the recipe of additives, syringe displacements for a portioning machine that includes at least one cartridge collectively having a plurality of cosmetic additives including a plurality of color pigments for cosmetics, each cartridge including at least one syringe associated with a distinct one of the additives, each syringe associated with a corresponding actuator; and
  causing actuation of the plurality of actuators by the portioning machine to displace the plurality of syringes in accordance with the calculated displacements to extrude from the at least one cartridge a cosmetic that is a mixture of at least two of the plurality of cosmetic additives, wherein the extruded cosmetic has the desired color match for the skin color of the subject.

P13. The method according to claim P12, wherein the recipe of additives specifies a volume and a set of additive ratios for the extruded cosmetic.

P14. The method according to claim P12, wherein at least one cartridge is replaceable.

P15. The method according to claim P12, wherein at least one cartridge includes a plurality of syringes, each associated with a different cosmetic additive.

P16. The method according to claim P12, wherein each actuator is configured to produce at least one of rotational motion or translational motion.

P17. The method according to claim P12, wherein each syringe includes a piston that interfaces with a corresponding actuator in the portioning machine.

P18. The method according to claim P12, wherein each syringe includes an actuator that interfaces with the portioning machine via an electronic interface.

P19. The method according to claim P12, wherein the additives include yellow, red, black, blue, and white additives.

P20. The method according to claim P12, wherein each syringe is coupled through a distinct line including a one-way valve to a corresponding distinct reservoir containing the cosmetic additive associated with the syringe.

P21. The method according to claim P12, wherein each syringe is configured to have both a dispensing stroke and a fill stroke, and wherein the method further comprises causing actuation of a given actuator associated with a given syringe to perform a fill stroke to fill the given syringe from a corresponding reservoir.

P22. The method according to claim P12, wherein receiving the recipe of additives comprises:
receiving RGB color values from a camera;
mapping the received RGB color values to a CIE L a*b* color space;
retrieving from memory CIE L a*b* coordinates for each of a plurality of stored color recipes; and
identifying a closest match between the mapped RGB color values and a stored color recipe;
wherein the closest match characterizes the skin color.

P23. A tangible, non-transitory computer readable medium having embodied therein a computer program which, when loaded into and executed by a device having a camera and a flash, causes the device to perform computer processes for determining color of skin of a subject, the computer processes comprising:
activating the flash to illuminate the skin to cause light therefrom to enter a light dispersion chamber through an open area facing the skin;
using the camera to record an image of a portion of the dispersed light in the chamber, wherein the camera is positioned to have a light path from the light dispersion chamber; and
processing the recorded image to characterize the skin color.

P24. The computer readable medium according to claim P23, wherein the camera has associated automatic camera settings and wherein using the camera to record the image comprises:
disabling the automatic camera settings;
setting the flash to a low intensity; and
waiting a predetermined amount of time after setting the flash, in order for the light output thereof to stabilize, before capturing the image.

P25. The computer readable medium according to claim P23, wherein processing the recorded image comprises:
receiving RGB color values from the camera;
mapping the received RGB color values to a CIE L a*b* color space;
retrieving from a memory CIE L a*b* coordinates for each of a plurality of stored color recipes; and
identifying a closest match between the mapped RGB color values and a stored color recipe;
wherein the closest match characterizes the skin color.

P26. The computer readable medium according to claim P25, wherein processing further includes:
receiving user input to alter the RGB color values in accordance with user preference.

P27. Apparatus for determining color of skin of a subject, the apparatus comprising:
a light dispersing chamber having an open area configured to face the skin;
a camera positioned to have a light path from the chamber;
a flash; and
a processor having associated memory configured to activate the flash to illuminate the skin to cause light therefrom to enter the light dispersion chamber through the open area facing the skin, use the camera to record an image of a portion of the dispersed light in the chamber, wherein the camera is positioned to have a light path from the light dispersion chamber, and process the recorded image to characterize the skin color.

P28. The apparatus according to claim P27, wherein the chamber is predominantly white.

P29. The apparatus according to claim P27, wherein the chamber includes an integrating sphere in the light path.

P30. The apparatus according to claim P27, wherein the camera, flash, and processor are integrated into a mobile device such that the processing is performed by the mobile device.

P31. The apparatus according to claim P27, wherein the chamber includes a plano-convex, bi convex or positive meniscus lens in the light path.

P32. The apparatus according to claim P27, wherein the chamber is part of a housing and wherein the housing is physically coupled to a device that includes the camera, flash, and processor.

P33. The apparatus according to claim P32, wherein the housing includes a light passage positioned over the flash.

P34. The apparatus according to claim P32, wherein device is a mobile device.

P35. The apparatus according to claim P27, wherein the camera has associated automatic camera settings and wherein using the camera to record the image comprises:
disabling the automatic camera settings;
setting the flash to a low intensity; and
waiting a predetermined amount of time after setting the flash, in order for the light output thereof to stabilize, before capturing the image.

P36. The apparatus according to claim P27, wherein the processing the recorded image comprises:
receiving RGB color values from the camera;
mapping the received RGB color values to a CIE L a*b* color space;
retrieving from memory CIE L a*b* coordinates for each of a plurality of stored color recipes; and
identifying a closest match between the mapped RGB color values and a stored color recipe;
wherein the closest match characterizes the skin color.

P37. The apparatus according to claim P36, wherein processing further includes:
receiving user input to alter the RGB color values in accordance with user preference.

P38. Apparatus for use in determining color of skin of a subject, the apparatus comprising:
a housing having a light dispersing chamber including an open area configured to face the skin and an opening providing a light path for a camera; and
a light dispersion element disposed in the chamber in the light path.

P39. The apparatus according to claim P38, wherein the chamber is predominantly white.

P40. The apparatus according to claim P38, wherein the light dispersion element comprises an integrating sphere.

P41. The apparatus according to claim P38, wherein the light dispersion element comprises a plano-convex, bi convex or positive meniscus lens.

P42. The apparatus according to claim P38, wherein the housing further comprises a light passage configured to direct light from a flash into the chamber.

P43. A portioning machine for providing a cosmetic having a desired color matched to skin of a subject, the portioning machine comprising:
at least one cartridge slot, each cartridge slot configured to receive a cartridge having at least one syringe associated with a distinct cosmetic additive for a cosmetic, each syringe associated with a corresponding actuator; and
a processor in communication with the at least one cartridge slot, the processor configured to receive a recipe of additives matched to the skin color of the subject, calculate syringe displacements based upon the recipe of additives, and cause actuation of the plurality of actuators to displace the plurality of syringes in accordance with the calculated displacements to extrude from the at least one cartridge a cosmetic that is a mixture of at least two of the plurality of cosmetic additives, wherein the extruded cosmetic has the desired color match for the skin color of the subject.

P44. The portioning machine according to claim P43, wherein the recipe of additives specifies a volume and a set of additive ratios for the extruded cosmetic.

P45. The portioning machine according to claim P43, wherein at least one cartridge is replaceable.

P46. The portioning machine according to claim P43, wherein at least one cartridge includes a plurality of syringes, each associated with a different cosmetic additive.

P47. The portioning machine according to claim P43, wherein each actuator is configured to produce at least one of rotational motion or translational motion.

P48. The portioning machine according to claim P43, wherein each syringe includes a piston that interfaces with a corresponding actuator in the portioning machine.

P49. The portioning machine according to claim P43, wherein each syringe includes an actuator that interfaces with the portioning machine via an electronic interface.

P50. The portioning machine according to claim P43, wherein the additives include yellow, red, black, blue, and white additives.

P51. The portioning machine according to claim P43, wherein each syringe is configured to have both a dispensing stroke and a fill stroke, and wherein the processor is further configured to cause actuation of a given actuator associated with a given syringe to perform a fill stroke to fill the given syringe from a corresponding reservoir.

P52. The portioning machine according to claim P43, wherein receiving the recipe of additives comprises:
receiving RGB color values from a camera;
mapping the received RGB color values to a CIE L a*b* color space;
retrieving from memory CIE L a*b* coordinates for each of a plurality of stored color recipes; and
identifying a closest match between the mapped RGB color values and a stored color recipe;
wherein the closest match characterizes the skin color.

P53. A system for providing a cosmetic having a desired color matched to skin of a subject, the system comprising:
a skin color matching device; and
a portioning machine in communication with the skin color matching device, wherein:
the skin color matching device comprises a light dispersing chamber having an open area configured to face the skin, a camera positioned to have a light path from the chamber, a flash, and a skin color matching processor having associated memory configured to activate the flash to illuminate the skin to cause light therefrom to enter the light dispersion chamber through the open area facing the skin, use the camera to record an image of a portion of the dispersed light in the chamber, wherein the camera is positioned to have a light path from the light dispersion chamber, process the recorded image to characterize the skin color, and provide skin color characterization information to the portioning machine; and
the portioning machine comprises at least one cartridge slot, each cartridge slot configured to receive a cartridge having at least one syringe associated with a distinct cosmetic additive for a cosmetic, each syringe associated with a corresponding actuator, and a portioning processor in communication with the at least one cartridge slot, the portioning processor configured to receive a recipe of additives matched to the skin color of the subject based on the skin color characterization information, calculate syringe displacements based upon the recipe of additives, and cause actuation of the plurality of actuators to displace the plurality of syringes in accordance with the calculated displacements to extrude from the at least one cartridge a cosmetic that is a mixture of at least two of the plurality of cosmetic additives, wherein the extruded cosmetic has the desired color match for the skin color of the subject.

P54. The system according to claim P53, wherein the recipe of additives specifies a volume and a set of additive ratios for the extruded cosmetic.

P55. The system according to claim P53, wherein at least one cartridge is replaceable.

P56. The system according to claim P53, wherein at least one cartridge includes a plurality of syringes, each associated with a different cosmetic additive.

P57. The system according to claim P53, wherein each actuator is configured to produce at least one of rotational motion or translational motion.

P58. The system according to claim P53, wherein each syringe includes a piston that interfaces with a corresponding actuator in the portioning machine.

P59. The system according to claim P53, wherein each syringe includes an actuator that interfaces with the portioning machine via an electronic interface.

P60. The system according to claim P53, wherein the additives include yellow, red, black, blue, and white additives.

P61. The system according to claim P53, wherein each syringe is configured to have both a dispensing stroke and a fill stroke, and wherein the processor is further configured to cause actuation of a given actuator associated with a given syringe to perform a fill stroke to fill the given syringe from a corresponding reservoir.

P62. The system according to claim P53, wherein receiving the recipe of additives comprises:
receiving RGB color values from the skin color matching device;
mapping the received RGB color values to a CIE L a*b* color space;
retrieving from memory CIE L a*b* coordinates for each of a plurality of stored color recipes; and
identifying a closest match between the mapped RGB color values and a stored color recipe;
wherein the closest match characterizes the skin color.

P63. The system according to claim P53, wherein the chamber is predominantly white.

P64. The system according to claim P53, wherein the chamber includes an integrating sphere in the light path.

P65. The system according to claim P53, wherein the camera, flash, and processor are integrated into a mobile device such that the processing is performed by the mobile device.

P66. The system according to claim P53, wherein the chamber includes a plano-convex, bi convex or positive meniscus lens in the light path.

P67. The system according to claim P53, wherein the chamber is part of a housing and wherein the housing is physically coupled to a device that includes the camera, flash, and processor.

P68. The system according to claim P67, wherein the housing includes a light passage positioned over the flash.

P69. The system according to claim P67, wherein the device that includes the camera, flash, and processor is a mobile device.

P70. The system according to claim P53, wherein the camera has associated automatic camera settings and wherein using the camera to record the image comprises:
disabling the automatic camera settings;
setting the flash to a low intensity; and
waiting a predetermined amount of time after setting the flash, in order for the light output thereof to stabilize, before capturing the image.

P71. The system according to claim P53, wherein the processing the recorded image comprises:
receiving RGB color values from the camera;
mapping the received RGB color values to a CIE L a*b* color space;
retrieving from memory CIE L a*b* coordinates for each of a plurality of stored color recipes; and
identifying a closest match between the mapped RGB color values and a stored color recipe;
wherein the closest match characterizes the skin color.

P72. The system according to claim P71, wherein processing further includes:
receiving user input to alter the RGB color values in accordance with user preference.

P73. A cartridge for use in a portioning machine for providing a cosmetic having a desired color matched to skin of a subject, the cartridge comprising:
at least one syringe, each syringe associated with a distinct cosmetic additive for a cosmetic.

P74. The cartridge according to claim P73, wherein each syringe comprises:
a one-way inlet valve configured to direct the distinct cosmetic additive from a distinct reservoir containing the distinct cosmetic additive into the syringe; and
a one-way outlet valve configured to output a portion of the distinct cosmetic additive contained in the syringe for the cosmetic.

P75. The portioning machine according to claim P73, wherein the cartridge is a replaceable cartridge.

P76. The portioning machine according to claim P73, wherein the cartridge includes a plurality of syringes, each associated with a different cosmetic additive.

P77. The portioning machine according to claim P73, wherein each syringe includes a piston configured to interface with a corresponding actuator in the portioning machine.

P78. The portioning machine according to claim P73, wherein each syringe includes an actuator configured to interface with the portioning machine via an electronic interface.

P79. The method according to claim P74, further comprising:
at least one reservoir, each reservoir associated with a distinct syringe and containing the distinct cosmetic additive associated with the syringe.

P80. The portioning machine according to claim P73, wherein each syringe is configured to have both a dispensing stroke and a fill stroke, wherein the fill stroke fills the syringe from a corresponding reservoir.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A portioning machine for providing a custom cosmetic, the portioning machine comprising:
a mixer having a mixing chamber;
at least one slot configured to support a plurality of dispensers, each slot configured to receive an assembly having at least one of the plurality of dispensers, each dispenser associated with an actuator and having an outlet for dispensing a distinct cosmetic additive for a custom cosmetic, wherein the mixer and the at least one slot are configured such that the outlet of each dispenser is positioned to dispense an additive from the dispenser into the mixing chamber when an assembly is installed in each slot; and
a portioning processor configured to control the actuators to dispense additives from selected dispensers into the mixing chamber in accordance with a target set of additive ratios to produce the custom cosmetic, wherein each dispenser is configured to have both a fill stroke to fill the dispenser from a corresponding reservoir and a dispensing stroke, and wherein the portioning processor is further configured to cause actuation of a given actuator associated with a given dispenser to perform the fill stroke to fill the given dispenser from the corresponding reservoir.

2. The portioning machine according to claim 1, wherein the at least one slot comprises a plurality of slots, each slot configured to receive an assembly having at least one dispenser.

3. The portioning machine according to claim 1, wherein the at least one slot comprises a slot configured to receive an assembly having a plurality of dispensers.

4. The portioning machine according to claim 1, wherein the portioning machine comprises a plurality of actuators, and wherein each dispenser includes a piston that is actuated by a corresponding actuator in the portioning machine.

5. The portioning machine according to claim 1, wherein each assembly includes, for each dispenser therein, an actuator that interfaces with the portioning machine via an electronic interface.

6. The portioning machine according to claim 1, wherein the mixer and the at least one slot are configured such that the outlet of each dispenser is positioned to dispense an additive from the dispenser directly into the mixing chamber when an assembly is installed in each slot.

7. The portioning machine according to claim 1, wherein each dispenser comprises a one-way inlet valve that allows fluid to be transferred from the corresponding reservoir into the dispenser during the fill stroke and a one-way outlet valve that allows fluid to be directed out of the dispenser during the dispensing stroke.

8. The portioning machine according to claim 1, wherein the corresponding reservoir is external to the portioning machine and couples to the dispenser via a conduit.

9. The portioning machine according to claim 1, wherein the portioning machine includes the corresponding reservoir.

10. The portioning machine according to claim 1, wherein the assembly associated with the given dispenser includes the corresponding reservoir.

11. The portioning machine according to claim 1, wherein each dispenser includes an inlet that is directly coupled to the corresponding reservoir.

12. The portioning machine according to claim 1, wherein the portioning processor is configured to calculate at least one of (a) the target set of additive ratios or (b) actuator based on the target set of additive ratios and a volume of cosmetic to be produced.

13. A portioning machine for providing a custom cosmetic, the portioning machine comprising:
- a mixer having a mixing chamber;
- a plurality of dispensers, each dispenser having an inlet for receiving a distinct cosmetic additive from a corresponding reservoir and an outlet for dispensing the distinct cosmetic additive into the mixing chamber; and
- a portioning processor configured to control the dispensers to selectively fill each dispenser from the corresponding reservoir via the dispenser inlet and to dispense additives from selected dispensers into the mixing chamber via the dispenser outlet in accordance with a target set of additive ratios to produce the custom cosmetic.

14. The portioning machine according to claim 13, wherein the portioning machine comprises a plurality of actuators, and wherein each dispenser includes a piston that is actuated by a corresponding actuator in the portioning machine.

15. The portioning machine according to claim 13, wherein each dispenser includes an actuator that interfaces with the portioning machine via an electronic interface.

16. The portioning machine according to claim 13, wherein the mixer and the plurality of dispensers are configured such that the outlet of each dispenser is positioned to dispense an additive from the dispenser directly into the mixing chamber.

17. The portioning machine according to claim 13, wherein each dispenser comprises a one-way inlet valve at the inlet that allows fluid to be transferred from the corresponding reservoir into the dispenser and a one-way outlet valve at the outlet that allows fluid to be directed out of the dispenser during a dispensing stroke.

18. The portioning machine according to claim 13, wherein the corresponding reservoir is external to the portioning machine and couples to the dispenser via a conduit.

19. The portioning machine according to claim 13, wherein the portioning machine includes the corresponding reservoir.

20. The portioning machine according to claim 13, wherein each dispenser includes its corresponding reservoir.

21. The portioning machine according to claim 13, wherein each dispenser includes an inlet that is directly coupled to the corresponding reservoir.

22. The portioning machine according to claim 13, wherein the portioning processor is configured to calculate at least one of (a) the target set of additive ratios or (b) actuator displacements based on the target set of additive ratios and a volume of cosmetic to be produced.

* * * * *